(12) United States Patent
Miura et al.

(10) Patent No.: US 11,181,812 B2
(45) Date of Patent: Nov. 23, 2021

(54) CAMERA PLATFORM SYSTEM

(71) Applicant: CANON KABUSHIKI KAISHA, Tokyo (JP)

(72) Inventors: Atsushi Miura, Kawasaki (JP); Hirotaka Ujiie, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 16/661,839

(22) Filed: Oct. 23, 2019

(65) Prior Publication Data

US 2020/0133098 A1    Apr. 30, 2020

(30) Foreign Application Priority Data

Oct. 31, 2018 (JP) .............................. JP2018-205866
Aug. 2, 2019 (JP) .............................. JP2019-143102

(51) Int. Cl.
*G03B 17/56* (2021.01)
*F16M 11/12* (2006.01)

(52) U.S. Cl.
CPC ......... *G03B 17/561* (2013.01); *F16M 11/125* (2013.01)

(58) Field of Classification Search
CPC .... G03B 17/561; G03B 17/566; H04N 5/232; H04N 5/23299; F16L 3/01; F16L 3/015; F16L 3/02; F16M 11/125; F16M 11/04; F16M 11/06; F16M 11/08; F16M 11/10; F16M 11/105; F16M 11/12; F16M 11/121; F16M 11/123; F16M 11/126; F16M 11/128; F16M 11/18; F16M 11/2007; F16M 11/2014; F16M 11/2021; F16M 11/2028; F16M 11/2035; F16M 11/2042;
(Continued)

(56) References Cited

U.S. PATENT DOCUMENTS

2015/0219981 A1 * 8/2015 Roberts .................. F16M 13/04
                                                   348/375
2016/0170289 A1 * 6/2016 Matt ...................... F16M 11/12
                                                   318/560
(Continued)

FOREIGN PATENT DOCUMENTS

CN         201289572 Y     8/2009
CN         104456022 A     3/2015
(Continued)

*Primary Examiner* — Clayton E. LaBalle
*Assistant Examiner* — Fang-Chi Chang
(74) *Attorney, Agent, or Firm* — Canon U.S.A., Inc. IP Division

(57) ABSTRACT

A camera platform system includes a stand to which an imaging apparatus is fixed, a camera platform apparatus configured to rotate the imaging apparatus fixed to the stand in a roll direction by rotating the stand, a clamp unit configured to clamp, on a rear surface side of the imaging apparatus, a cable that electrically connects the imaging apparatus and the camera platform apparatus, and a guide unit configured to guide the cable clamped by the clamp unit, to the camera platform apparatus. The clamp unit is disposed inside a rotation locus by a rotation region that is rotated integrally with the stand when the imaging apparatus is rotated in the roll direction. The guide unit is disposed outside the rotation locus.

16 Claims, 18 Drawing Sheets

(58) Field of Classification Search
CPC ............. F16M 11/205; F16M 11/2057; F16M 11/2064; F16M 11/2071
See application file for complete search history.

(56) References Cited

U.S. PATENT DOCUMENTS

2019/0324353 A1* 10/2019 Liwszyc .................. H02K 5/00
2020/0128157 A1* 4/2020 Ochi ...................... G03B 17/56

FOREIGN PATENT DOCUMENTS

| | | | |
|---|---|---|---|
| CN | 108016378 A | 5/2018 | |
| CN | 207687604 U | 8/2018 | |
| CN | 108488570 A | 9/2018 | |
| CN | 108488577 A | 9/2018 | |
| DE | 19653016 A1 | 7/1998 | |
| JP | 2010245409 A | 10/2010 | |
| JP | 2010533884 A | 10/2010 | |
| WO | 2018194629 A1 | 10/2018 | |
| WO | WO-2018194047 A1 * | 10/2018 | ............. G03B 15/00 |

* cited by examiner

: IMAGING RANGE OF MAIN CAMERA

CAMERA PLATFORM SYSTEM

BACKGROUND OF THE DISCLOSURE

Field of the Disclosure

The disclosure relates to a camera platform system, and in particular to a camera platform system including a unit to clamp a cable.

Description of the Related Art

In a camera platform system on which an imaging apparatus is mounted for pan/tilt driving, the imaging apparatus and a control apparatus of the imaging apparatus each include an electric connector for connection with an external device.

Japanese Unexamined Patent Application Publication (Translation of PCT Application) No. 2010-533884 discusses a camera platform system that includes a mechanism (rotator) performing roll driving in addition to a mechanism performing pan/tilt driving, and rotates the imaging apparatus around an optical axis in imaging. When a large number of cables are connected to the imaging apparatus, the control apparatus, the camera platform, and the like, the cables may be caught in setting of the camera platform or in pan/tilt operation, which may cause coming-off or breakage of the connector.

Further, Japanese Patent Application Laid-Open No. 2010-245409 discusses a structure in which a position of a clamp portion of a cable is changeable.

In a method of fixing a cable discussed in Japanese Patent Application Laid-Open No. 2010-245409, however, movement of an apparatus into which the cable is inserted is not considered, and clamp of a cable when the imaging apparatus is rotated around the optical axis is not discussed, unlike Japanese Unexamined Patent Application Publication (Translation of PCT Application) No. 2010-533884.

SUMMARY OF THE DISCLOSURE

According to an aspect of the disclosure, a camera platform system includes a stand to which an imaging apparatus is fixed, a camera platform apparatus configured to rotate the imaging apparatus fixed to the stand in a roll direction by rotating the stand, a clamp unit configured to clamp, on a rear surface side of the imaging apparatus, a cable that electrically connects the imaging apparatus and the camera platform apparatus, and a guide unit configured to guide the cable clamped by the clamp unit, to the camera platform apparatus. The clamp unit is disposed inside a rotation locus by a rotation region that is rotated integrally with the stand when the imaging apparatus is rotated in the roll direction. The guide unit is disposed outside the rotation locus.

Further features and aspects of the disclosure will become apparent from the following description of example embodiments with reference to the attached drawings.

DESCRIPTION OF THE EMBODIMENTS

Figure 1:
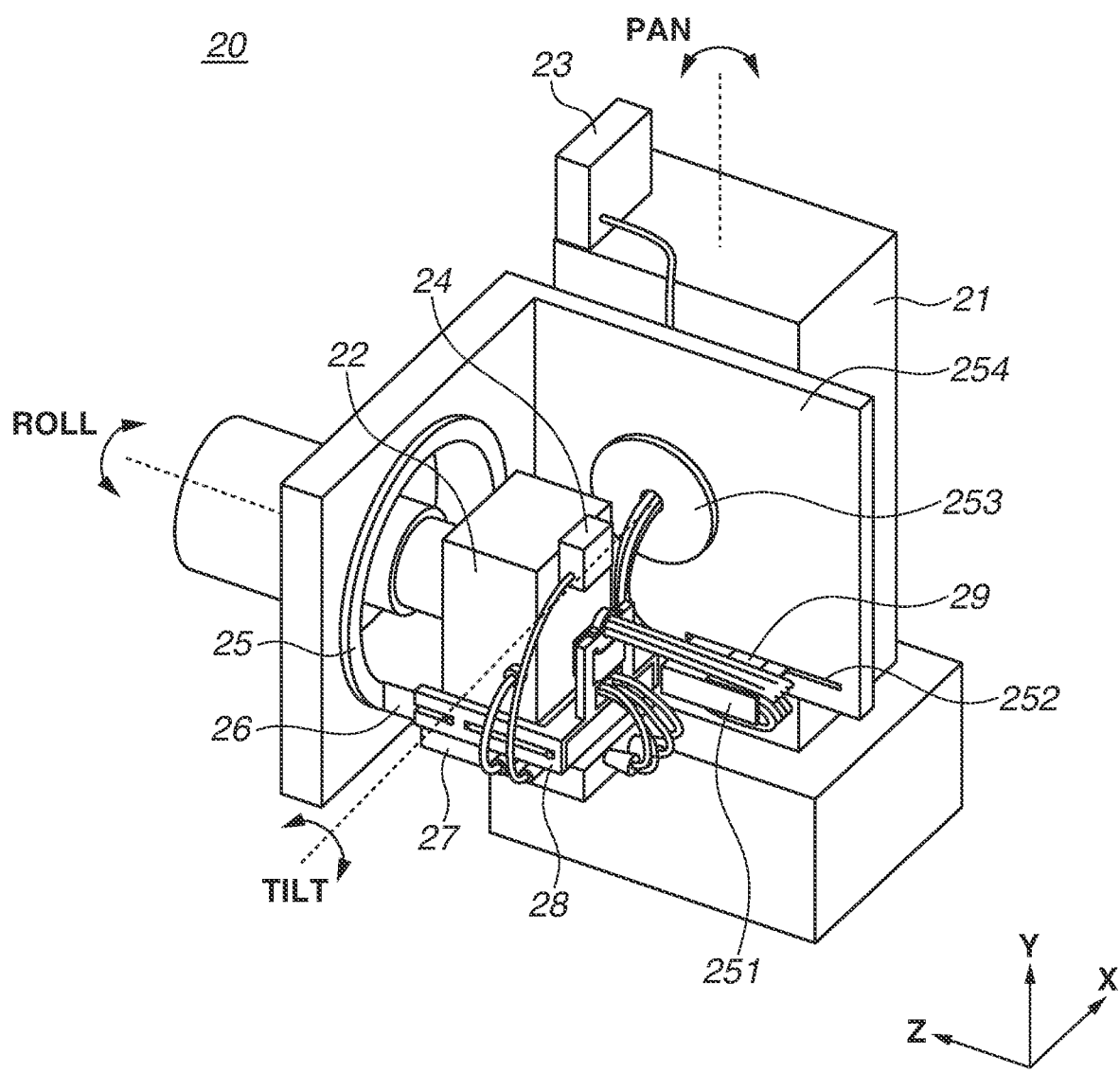
FIG. 1 is a perspective view according to a first example embodiment.

Various example embodiments, features and aspects of the disclosure are described in detail below with reference to drawings. Components illustrated in the example embodiments are illustrative and do not limit the disclosure.

When an imaging apparatus is rotated around an optical axis by a rotator, a distance from each of a control apparatus and the imaging apparatus to a camera platform apparatus body is varied based on a rotation angle. Accordingly, it is necessary to arrange cables with maintaining sufficient extra lengths in order to prevent a pulled state when a distance between connectors becomes the maximum. In contrast, when the distance between the connectors is reduced, the cables are largely loosened. When the camera platform apparatus performs the pan/tilt operation, it is necessary to secure larger extra lengths of the cables. When the camera platform apparatus is operated in that state, a camera platform and the cables may be entangled, which may cause defect such as breakage of the connector or inhibition of camera platform operation.

Therefore, in the following example embodiments, a camera platform system that performs roll operation of the imaging apparatus and can reduce contact between the camera platform apparatus and the cables and entanglement of the cables is described.

A configuration according to a first example embodiment of the disclosure is described with reference to a perspective view of FIG. 1 and a block diagram of FIG. 2.

A camera rotation system according to the example embodiment includes an operating device 10 and a camera platform system 20. When a photographer operates the operating device 10, an operation instruction corresponding to operation contents is transmitted from the operating device 10 to the camera platform system 20 through a network. The camera platform system 20 performs control corresponding to the received operation instruction, which allows for remote operation of the camera platform system 20 from the operating device 10.

The camera platform system 20 includes a camera platform 21, a main camera 22, a wide-angle imaging camera 23, a finder imaging camera 24, a stand to which the main camera 22 is fixed (referred to as camera stand 26), a control box unit 27, and a cable clamp unit 28. In the description of the example embodiment, respective directions illustrated by arrows in FIG. 1 are defined as X direction, Y direction, and Z direction. The Z direction corresponds to an optical axis direction of the main camera 22 when the main camera 22 is fixed to the camera table 26.

In the Z direction, a surface viewed from lens side (upstream side in optical axis) of the main camera 22 is referred to as a front surface, and a surface opposite to the front surface is referred to as a rear surface. A surface viewed from right side of the front surface is referred to as a right-side surface, a surface viewed from left side of the front surface is referred to as a left-side surface, a surface viewed from upper side of the front surface is referred to as a top surface, and a surface viewed from lower side of the front surface is referred to as a bottom surface. When projected in the Z direction, the front surface and the rear surface each have an area, but the right-side surface, the left-side surface, the top surface, and the bottom surface each do not have an area (become a line segment). In a case where the apparatuses and units configuring the camera platform system are inclined to the Z direction, a surface having a larger width projected in the Z direction (length in X direction) is referred to as the front surface or the rear surface, and a surface having a smaller width is referred to as a side surface.

The camera platform 21 includes an interface unit 211 and a drive control unit 212. The interface unit 211 mainly performs communication and processing of an image, and the driving control unit 212 mainly performs control of various kinds of motors.

The interface unit 211 includes an interface central processing unit (CPU) 211, an image processing unit 2112, and a communication unit 2113. The drive control unit 212 includes a drive control CPU 2121, and motor control units 2122 (2122a to 2122d) and motors 2123 (2123a to 2123d) for zooming, rolling, tilting, and panning.

The operation instruction from the operating device 10 is transmitted to the interface CPU 2111 through the communication unit 2113. In a case where the operation instruction is a pan drive control instruction, a drive instruction is transmitted to the drive control unit 212, and an instruction is provided to the pan control unit 2122a through the drive control CPU 2121. Further, the pan motor 2123a is driven in response to the pan drive control instruction.

Likewise, in a case where the operation instruction is a tilt drive control instruction, the tilt motor 2123b is controlled through the tilt control unit 2122b. In a case where the operation instruction is a roll control instruction, the roll motor 2123c is controlled through the roll control unit 2122c. In a case where the operation instruction is a zoom control instruction, the zoom motor 2123d is controlled through the zoom control unit 2122d. Accordingly, the drive control unit 212 functions as a drive unit for each of the cameras.

A rotator 25 illustrated in FIG. 1 is a rotation mechanism that can rotate the main camera 22 in a roll direction in the drive control unit 212, and includes the above-described roll motor 2123c.

The image processing unit 2112 transmits an image output from each of the main camera 22, the wide-angle imaging camera 23, and the finder imaging camera 24, to the interface CPU 2111. The interface CPU 211 transmits, through the communication unit 2113, the images from the respective cameras and communication data (e.g., information about position and attitude of each of cameras) that is used for operation of each of the cameras by the operating device 10, so as to display the images and the communication data on the operating device 10. Using one transmission path in transmission of the images from the cameras to the operating device 10 makes it possible to reduce delay between the images as compared with a case where a plurality of transmission paths is used for respective images. As described below, the images transmitted to the operating device 10 may be images from a part of the cameras.

Figure 3:
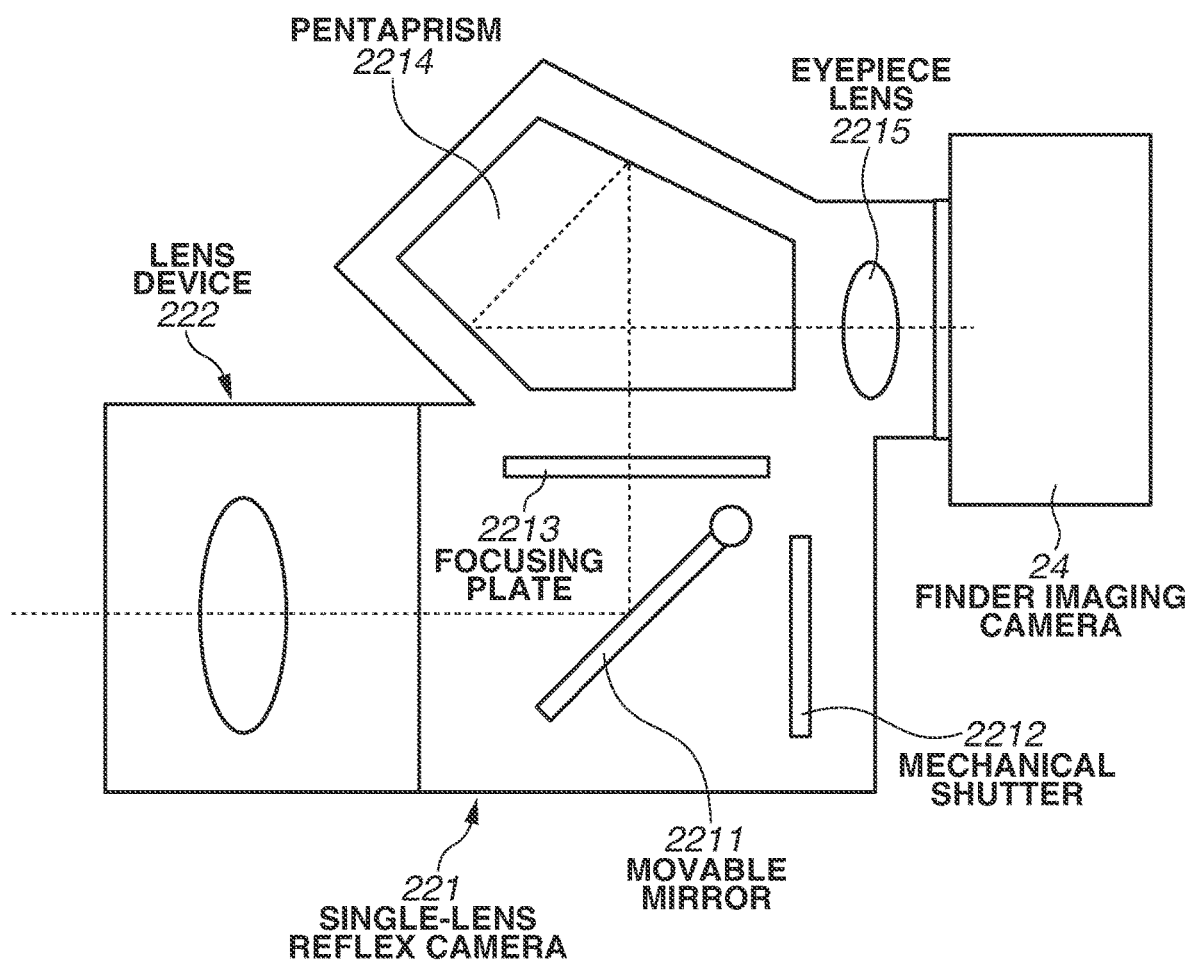
FIG. 3 is a diagram illustrating a configuration of a main camera and a finder imaging camera according to the first example embodiment.

FIG. 3 illustrates an example of a configuration of the main camera 22 and the finder imaging camera 24. The main camera 22 includes a single-lens reflex camera 221 and a lens device 222 for imaging of a still image. In a normal state where imaging by the main camera 22 is not performed, a movable mirror 2211 is disposed in an inclined manner in front of a mechanical shutter 2212 as illustrated in FIG. 3. A light flux having passed through the lens device 222 is reflected upward by the movable mirror 2211, and the reflected light flux forms an image on a focusing plate 2213 once. The light flux having formed an image on the focusing plate 2213 passes through a pentaprism 2214 and an eyepiece lens 2215, and then reaches the finder imaging camera 24.

In the imaging by the main camera 22, the movable mirror 2211 is rotated around a not-illustrated rotation axis so as to be flipped up. In this case, the light flux having passed through the lens device 222 passes through the mechanical shutter 2212, and then reaches a not-illustrated imaging device.

Configuring the main camera 22 and the finder imaging camera 24 in the above-described manner enables the finder imaging camera 24 to capture the image that is the same as the image captured by the main camera 22.

At this time, for example, a camera with a small number of pixels and a low frame rate as compared with the main camera 22 is used as the finder imaging camera 24, which enables image transmission with a low delay. In other words, as the images output from the interface unit 211 to the operating device 10 through the network in the imaging, using the image captured by the wide-angle imaging camera 23 and the image captured by the finder imaging camera 24 makes it possible to suppress imaging time lag for an operator. Further, as the finder imaging camera 24, using a camera with low power consumption as compared with the main camera 22 makes it possible to suppress power consumption by the camera platform system 20. When the finder imaging camera 24 satisfies at least one of conditions of the small number of pixels, the low frame rate, and the low power consumption as compared with the main camera 22, an effect corresponding to the satisfied condition is obtainable.

Next, relationship between the image captured by the main camera 22 and the image captured by the wide-angle imaging camera 23 is described with use of examples illustrated in FIGS. 4A to 4F.

Figure 4A:
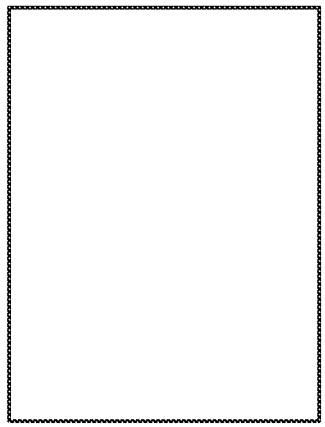
FIGS. 4A to 4F illustrate examples of images captured by the main camera and a wide-angle imaging camera according to the first example embodiment.
Figure 4B:
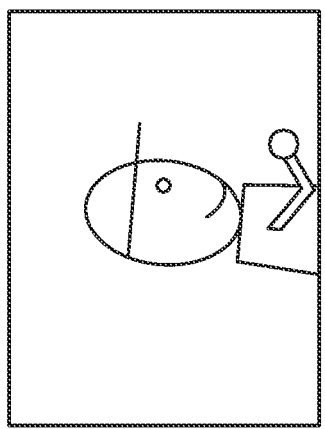
Figure 4C:
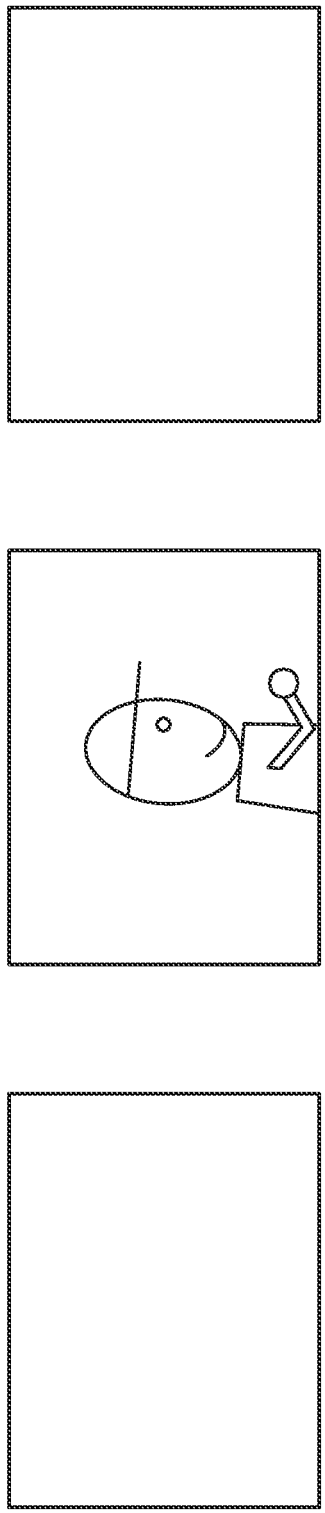
Figure 4D:
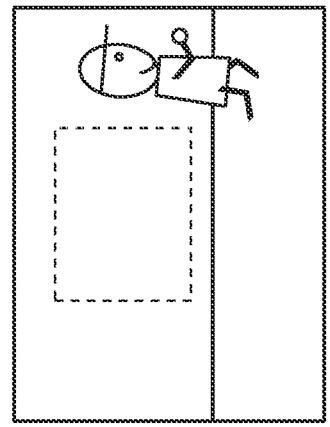
Figure 4E:
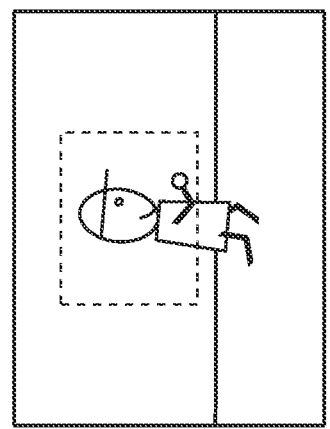
Figure 4F:
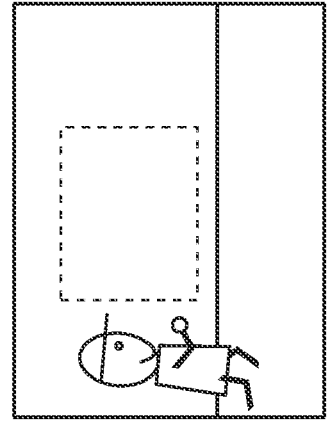

FIGS. 4A to 4C illustrate the example images obtained by imaging a moving object by the main camera 22, arranged in time series. Further, FIGS. 4D to 4F illustrate the example images obtained by imaging the moving object by the wide-angle imaging camera 23 in a similar manner, arranged in time series. To facilitate description, an imaging range of the main camera 22 is illustrated by a dashed line in FIGS. 4D to 4F.

In imaging of the moving object by the main camera 22, the object can be confirmed in a part of the images of a short time as illustrated in FIGS. 4A to 4C. Further, as illustrated in FIG. 4B, when the operator tries to image the object large in the image, if a moving speed of the object in a field angle is high, it is difficult for the operator to match the imaging timing. In particular, in a case where transmission delay is between the camera platform system 20 (main camera 22) and the operating device 10, the photographer may miss the imaging timing when the photographer operates the operating device 10 to start imaging after the photographer recognizes the object in a screen of the operating device 10.

In contrast, as illustrated in FIGS. 4D to 4F, the photographer can more accurately confirm the position of the object by checking the image captured by the wide-angle imaging camera 23. Accordingly, as compared with confirmation with the image by the view angle of the main camera 22, it is easy to match the imaging timing for the object.

Using the image captured by the wide-angle imaging camera 23 as described above allows for accurate recognition of the imaging timing of the moving object. Further, since the position of the object can be known, pan/tilt operation of the camera can be easily performed based on the position of the object.

As described above, the wide-angle imaging camera 23 and the finder imaging camera 24 are provided separately from the main camera 22, and live view is performed based on the image captured by the wide-angle imaging camera 23 and the image captured by the tinder imaging camera 24. This enables the photographer to easily determine the imaging timing.

The image captured by the wide-angle imaging camera 23 and the image captured by the finder imaging camera 24 may be combined such that relationship between the field angle of the wide-angle imaging camera 23 and the field angle of the tinder imaging camera 24 can be recognized, and the combined image may be transmitted to the operating device 10.

Further, since each of the main camera 22, the wide-angle imaging camera 23, and the finder imaging camera 24 performs rotating operation around the same common rotation axis, influence of the rotation such as displacement among the cameras is not applied, and complicated correction and cooperation are unnecessary. Furthermore, the interface CPU 2111 transmits the images from the respective cameras through one transmission path, which makes it possible to prevent occurrence of delay difference due to use of a plurality of transmission methods or transmission paths. Accordingly, it is possible to construct the imaging system that facilitates determination of imaging timing.

Figure 5:
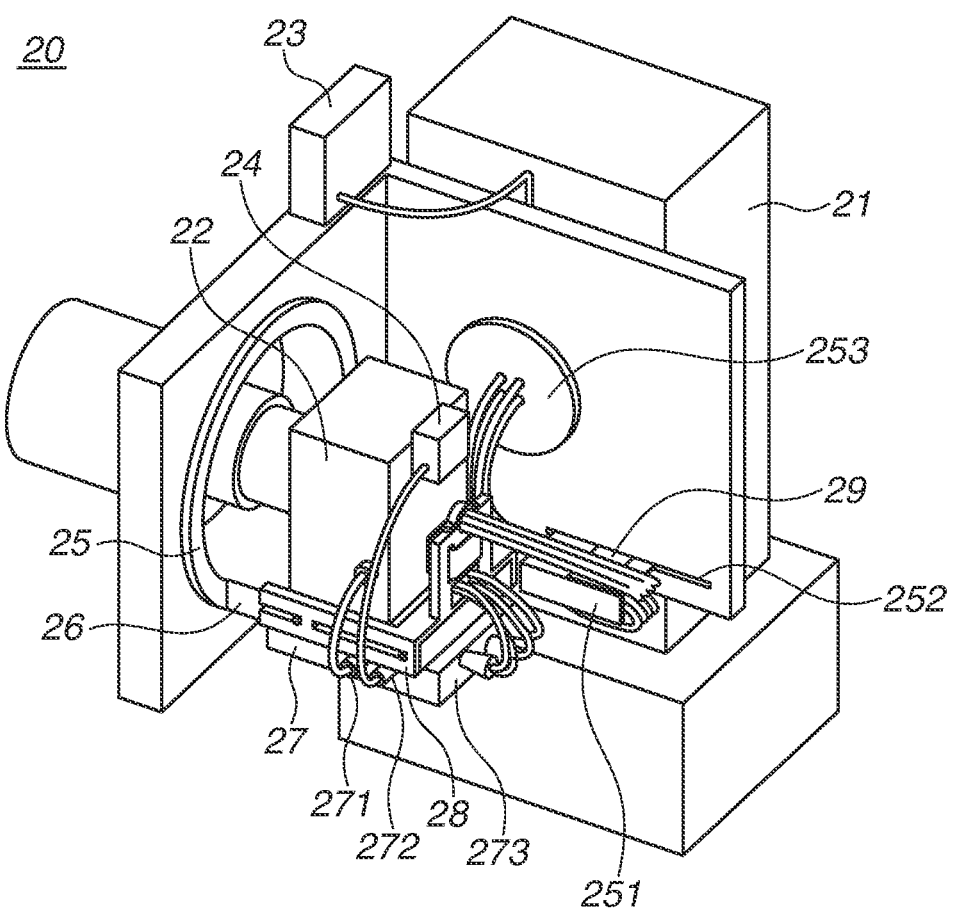
FIG. 5 illustrates an example in a case where the main camera and the wide-angle imaging camera according to the first example embodiment are attached to a camera platform so as to perform pan/tilt rotation around the same rotation axis.

Next, a modification of the example embodiment is described with reference to FIG. 5. In the example illustrated in FIG. 1, the wide-angle imaging camera 23 is attached at a position where only the rotation axis in panning is same as the rotation axis of each of the main camera 22 and the finder imaging camera 24. In this example, the attachment position of the wide-angle imaging camera 23 may be changed as illustrated in FIG. 5 such that the wide-angle imaging camera 23 is operated with a rotation axis that is the same as the rotation axis of each of the main camera 22 and the tinder imaging camera 24 in both of panning and tilting. Further, as another modification, the wide-angle imaging camera 23 may be fastened to the lens device 222 such that the wide-angle imaging camera 23 is operated with a rotation axis that is the same as the rotation axis of the main camera 22 in any rotating operation of panning, tilting, and rolling.

Figure 2:
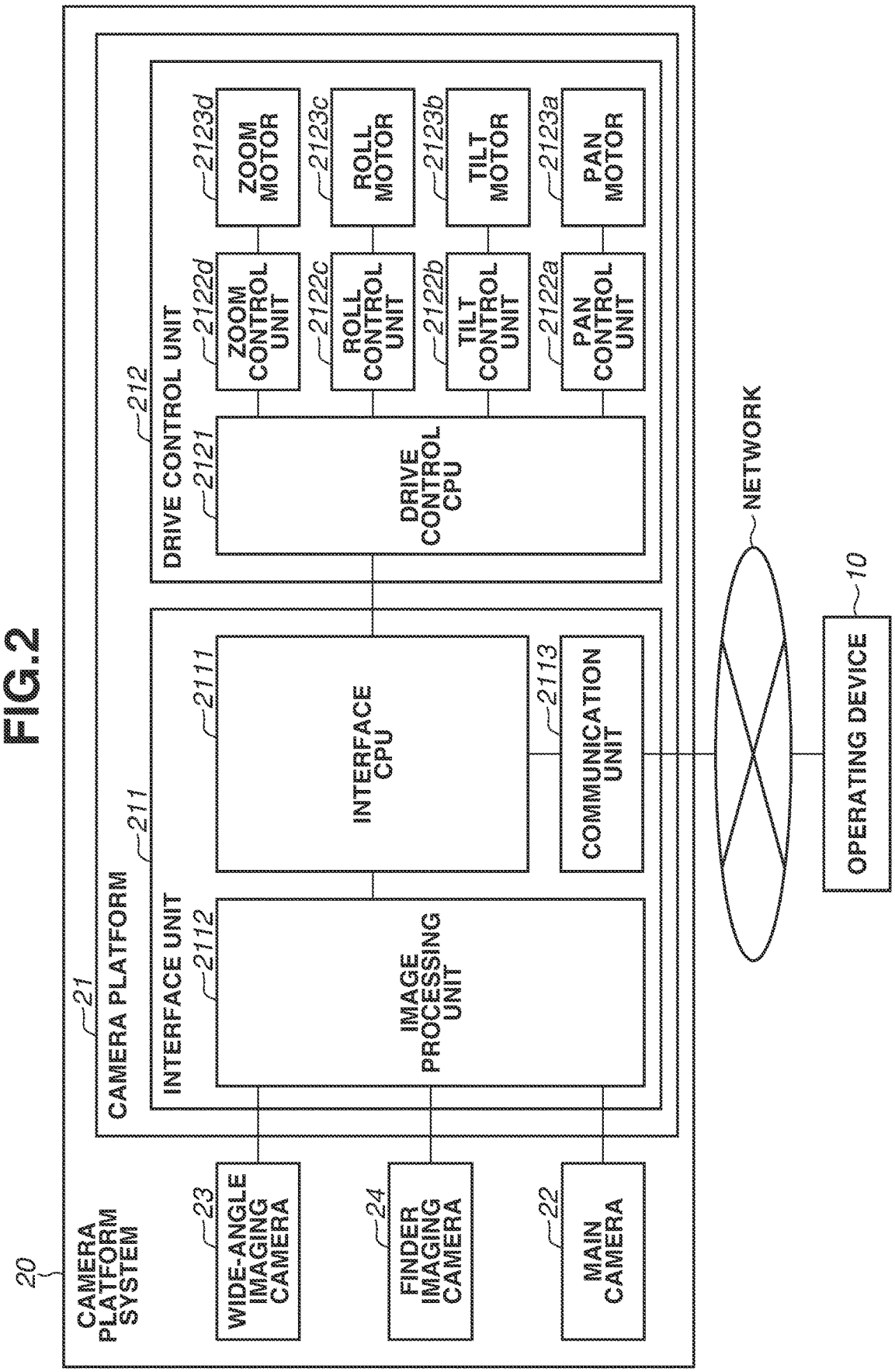
FIG. 2 is a block diagram according to the first example embodiment.

Further, in FIG. 2, the image processing unit 2112 and the communication unit 2113 are provided separately from the interface CPU 2111; however, the image processing unit 2112, the communication unit 2113, and the interface CPU 2111 may be integrated as one unit. Further, although the image processing unit 2112 has a role to acquire the image from each of the cameras, the image processing unit 2112 may have a function to control each of the cameras and setting of each of the cameras may be controlled from the interface CPU 2111.

Further, the image captured by the wide-angle imaging camera 23 and the image captured by the finder imaging camera 24 are output to the network from the interface unit 211; however, the output may be selected from the image captured by the finder imaging camera 24 and the image captured by the main camera 22. Moreover, although zooming is controlled through the zoom control unit 2122d, zooming may be controlled through the main camera 22 in a case where the main camera 22 has a zoom control function. Although each of the motor control units 2122 is also provided separately from the drive control CPU 2121, each of the motor control units 2122 may be integrated with the drive control CPU 2121. Further, the interface CPU 2111 and the drive control CPU 2121 may be controlled by one CPU.

The camera stand 26 is a stand fixed to the rotator 25 of the camera platform 21, and the main camera 22 can be fixed to the camera stand 26. The camera stand 26 is rotated in pan, tilt, and roll directions along with rotation of the camera platform 21 in the pan, tilt, and roll directions.

The control box unit 27 is configured by a circuit or a processor that translates communication between the main camera 22 and the camera platform 21. When a control instruction to the main camera 22 such as a release control instruction or a focus control instruction is input from the operating device 10, the control instruction is input to the main camera 22 through the camera platform 21 and the control box unit 27. The image captured by the main camera 22 is output to a display unit (not illustrated) through the control box unit 27 and the camera platform 21. The control box unit 27 is fixed to the camera stand 26, and is rotated along with rotation of the main camera 22 in the pan, tilt, and roll directions. The control box unit 27 includes an electric connector 271 into which a cable to be connected to the main camera 22 is inserted, an electric connector 272 into which a cable to be connected to the finder imaging camera 24 is inserted, and an electric connector 273 into which a cable to be connected to the camera platform 21 is inserted.

A detailed configuration of the cable clamp unit 28 according to the example embodiment is described below with reference to FIGS. 6A to 6C.

A distance between the electric connector 273 of the control box unit 27 into which the cable connected to the camera platform 21 is inserted and an electric connector portion (not illustrated) of the camera platform 21 into which the cable connected to the control box unit 27 is inserted, may be varied when the tilt/roll operation is performed. Therefore, it is necessary to set the length of the cable connecting the units, to a slightly large length including a margin. Thus, the cable is easily caught when the pan/tilt operation or the roll operation is performed, which may cause coming-off or breakage of a connector. In the camera platform system according to the example embodiment, the camera platform 21 performs the pan operation along with the pan operation of the main camera 22, and the relative positions of the camera platform 21 and the main camera 22 are not changed. In contrast, the camera platform 21 is not rotated when the main camera 22 performs the tilt/roll operation, and the relative positions of the camera platform 21 and the main camera 22 are changed.

Figure 17:
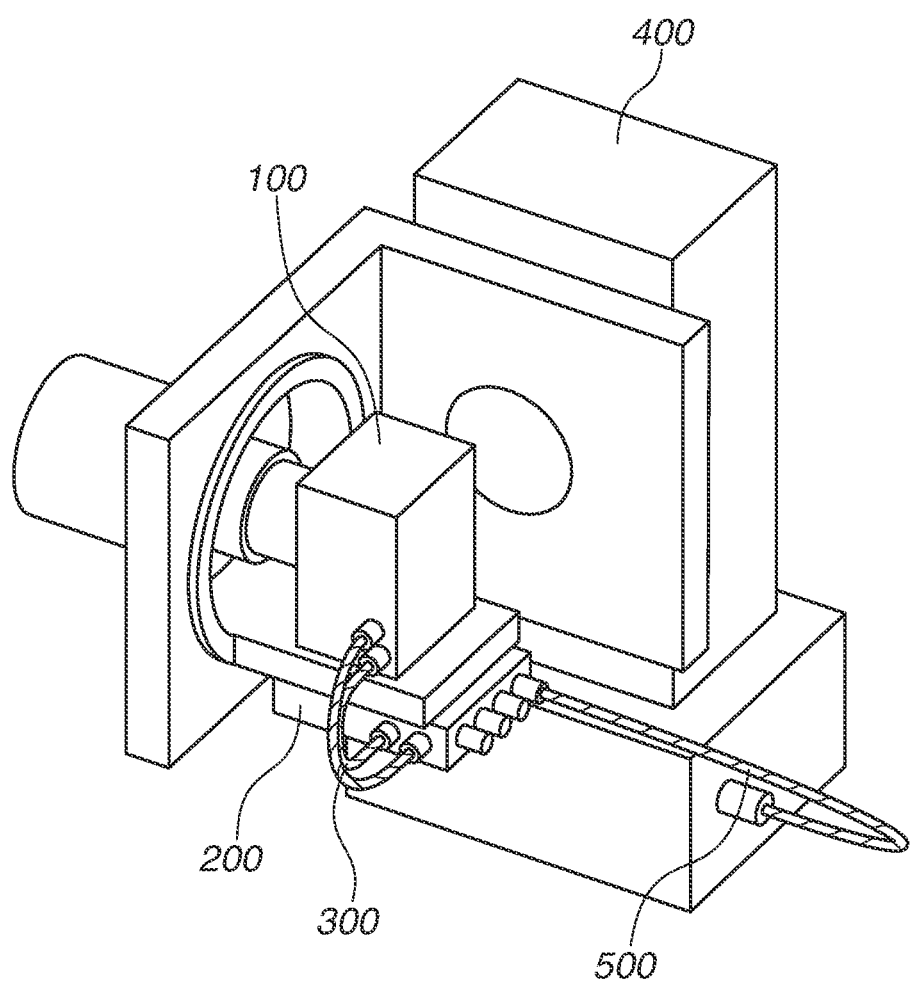
FIG. 17 is a perspective view according to a comparative example.
Figure 18:
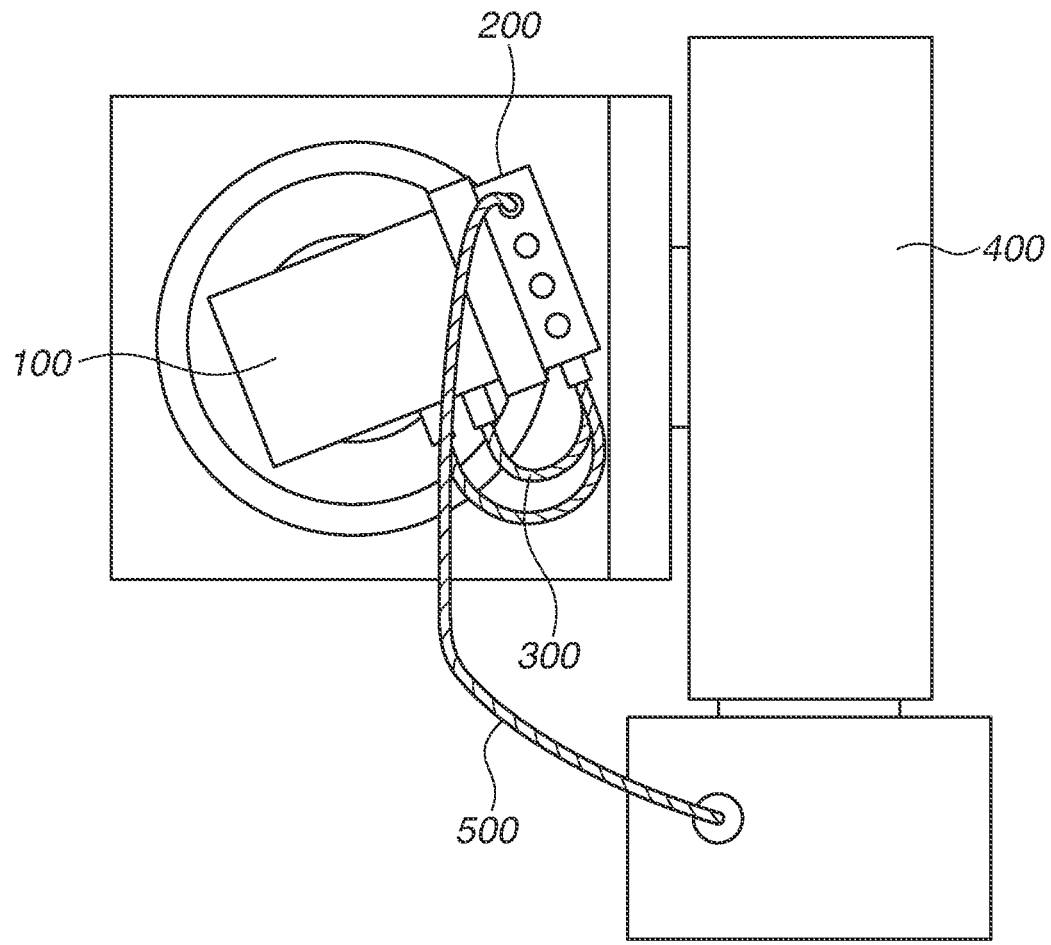
FIG. 18 is a diagram illustrating a state where a main camera is rotated according to the comparative example.

FIG. 17 and FIG. 18 are diagrams each illustrating a configuration according to a comparative example of the example embodiment. The comparative example is different from the example embodiment (FIG. 1 and FIG. 5) in that the cable clamp unit 28 is not provided. In the comparative example, a main camera 100 is connected to a control box unit 200 by a connector cable (hereinafter, simply referred to as cable) 300, and the control box unit 200 is connected to a camera platform 400 by a cable 500. As described above, the cables are connected with a margin for tilt/roll operation. In FIG. 17, the cable 300 that connects the main camera 100 and the control box unit 200 extends in a radial direction opposite to the camera platform 400, and does not interfere with the camera platform 400. However, when the main camera 100 is rotated in the roll direction by the camera platform 400 as illustrated in FIG. 18, the cable 300 that connects the main camera 100 and the control box unit 200 interferes with a part of the camera platform 400. When a distance between the camera platform 400 and a rotation axis is increased, it is possible to avoid the interference; however, this causes an issue in which the whole of the camera platform system is upsized. Therefore, the camera platform system according to the example embodiment includes the cable clamp unit 28 and a guide unit 251 that fix the cables, on a rear surface of the main camera 22.

Figure 6A:
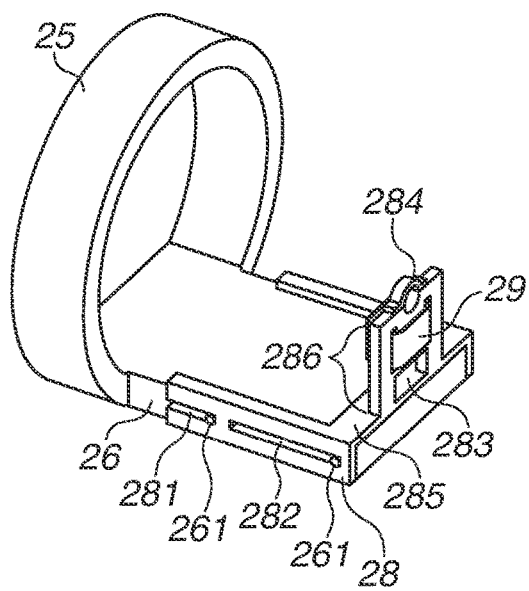
FIGS. 6A to 6C are perspective views each illustrating a cable clamp unit according to the first example embodiment.
Figure 6B:
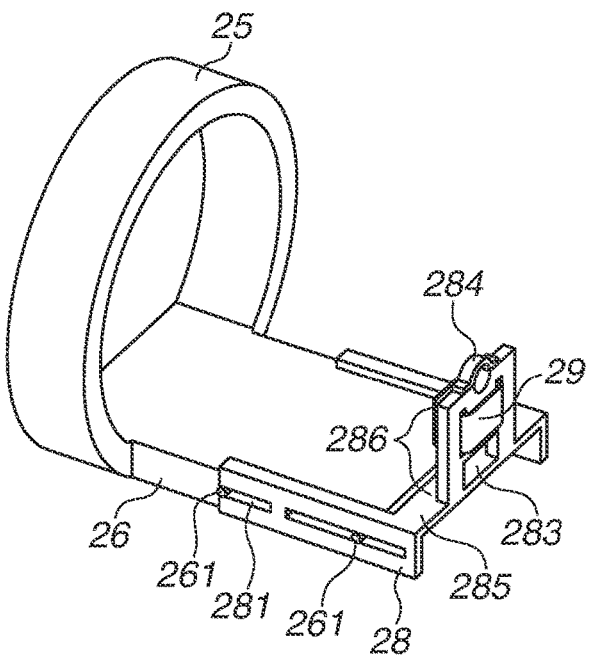
Figure 6C:
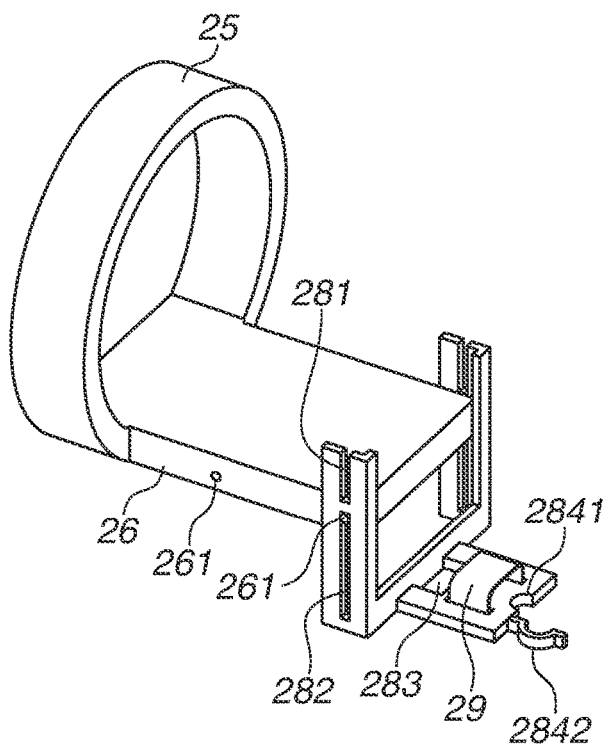

FIGS. 6A to 6C are perspective views illustrating a state where the cable clamp unit 28 is attached to the camera stand 26. The cable clamp unit 28 includes a first clamp portion 284, a second clamp portion 283, and a connection portion that movably fixes the first and second clamp portions 284 and 283 to the camera stand 26.

The connection portion includes a first plate 285 that includes long grooves 281 and 282, and the first plate 285 is fixed to the camera stand 26 by a not-illustrated fixing member such as a screw. The first plate 285 is supported so as to be slidable in the Z direction with respect to the camera stand 26 through fitting of a plurality of protrusions 261 provided on the camera stand 26 into the long grooves 281 and 282 of the first plate 285. Further, the first clamp portion 284 and the second clamp portion 283 of the cable clamp unit 28 are fixed to the plate 285. When the first plate 285 slides with respect to the camera stand 26, the first and second clamp portions 284 and 283 also slide with respect to the camera stand 26. In the camera platform system according to the example embodiment, the main camera 22 is exchangeable. Accordingly, as illustrated in FIGS. 6A and 6B, the position of the cable clamp unit 28 in the Z direction is changeable depending on the size of the mounted camera.

In the case where the clamp unit includes the plurality of clamp portions, the clamp portions are regarded as the first clamp portion 284 and the second clamp portion 283 in order closer to a rotation axis in roll rotation (referred to as roll rotation axis). As illustrated in FIGS. 6A to 6C, each of the first clamp portion 284 and the second clamp portion 283 has a hollow structure. The second clamp portion 283 has a structure in which a hole is provided on a second plate 286. In contrast, the first clamp portion 284 has the hollow structure configured by a groove 2841 (first member) provided on the second plate 286 and a lid 2842 (second member) that is opened or closed through movement with respect to the second plate 286. As illustrated in FIGS. 6A and 6B, the lid 2842 is fixed at a position facing the groove 2841. This forms the hollow structure and clamps cables. In contrast, when the lid 2842 is retreated from the position facing the groove 2841 as illustrated in FIG. 6C, the first clamp portion 284 can easily clamp or release the cables. Further, a detachable cable band 29 is attached to the cable clamp unit 28, as an adjustment portion that bundles the cables to adjust extra lengths of the cables. The above is the configuration of the cable clamp unit 28.

As illustrated in FIG. 5 and FIGS. 6A to 6C, the second plate 286 including the first clamp portion 284 and the second clamp portion 283 protrudes toward the main camera from the camera stand 26, and is located on the rear surface of the main camera. On the other hand, in the camera platform system according to the example embodiment, a rotation region rotated by rotating operation in the roll direction includes the camera stand 26 and the control box unit 27. Therefore, at least one of the first and second clamp portions is disposed inside a rotation locus 800 drawn by the rotation region in the rotating operation in the roll direction (hereinafter, roll rotating operation). In the roll rotating operation, the rotation locus 800 is a locus drawn by the region farthest from a roll rotation axis (z axis) of the rotation region, in the rotation in the roll direction, on a plane (xy plane) perpendicular to the roll rotation axis. In this example, the main camera 22 is appropriately exchangeable by the user based on imaging and an outer shape of the main camera 22 is unknown. Accordingly, the position of each of the clamp portions is set by assuming that the main camera 22 and the finder imaging camera 24 attached to the main camera 22 are not included in the rotation region at the time of defining the rotation locus. However, actually, the members appropriately exchangeable by the user, such as the main camera 22, the finder imaging camera 24, and lenses attached thereto may cause restriction. When the first clamp portion and the second clamp portion are rotated along with rotation of the camera stand 26 and the region farthest from the roll rotation axis of the rotation region is the first or second clamp portion, the region farthest from the roll rotation axis is located on the rotation locus. Accordingly, the first or second clamp portion is not disposed inside the rotation locus. In other words, when the first and second clamp portions perform roll rotation along with the roll rotating operation of the camera stand 26, the first and second clamp portions are disposed so as not to be located in the region farthest from the roll rotation axis of the rotation region. To do so, for example, the first and second clamp portions are disposed closer to the roll rotation axis than the camera stand 26. The effects derived from the state where the first and second clamp portions are disposed inside the rotation locus are described below with reference to FIG. 8.

Further, the cable clamp unit 28 is disposed so as to hide a part of the rear surface of the main camera 22. Therefore, when setting is performed by directly touching operation buttons and the like on a body of the main camera 22 in installation of the camera platform apparatus, the cable clamp unit 28 may obstruct the operation to impair workability. Likewise, when the plurality of cables 30 is connected to the control box unit 27, the cable clamp unit 28 may obstruct the connection to impair workability. In addition, depending on a combination of the main camera 22 and an interchangeable lens, workability may be impaired when the interchangeable lens is exchanged while the main camera 22 is fixed to the camera stand 26. When the cable clamp unit 28 according to the example embodiment further slides rearward in the Z direction from the state illustrated in FIG. 6B, the long groove 281 is detached from the front protrusion 261. Further, as illustrated in FIG. 6C, the first and second clamp portions can be rotated in the tilt direction with respect to the camera stand 26. With this configuration, the clamp portions are moved from a position where a distance from the roll rotation axis is small as compared with the camera stand 26, to a position where a distance from the roll rotation axis is large as compared with the camera stand 26. As a result, the first and second clamp portions can be retreated from the rear surface of the main camera 22 and the connection portions of the electric connectors of the control box unit 27, which makes it possible to secure workability in setting of the main camera 22 and in connector connection of the control box unit 27. In the state illustrated in FIG. 6C, the plurality of cables 30 can be freely detached from the cable clamp unit 28 by opening the lid 2842 of the first clamp portion 284.

Figure 7:
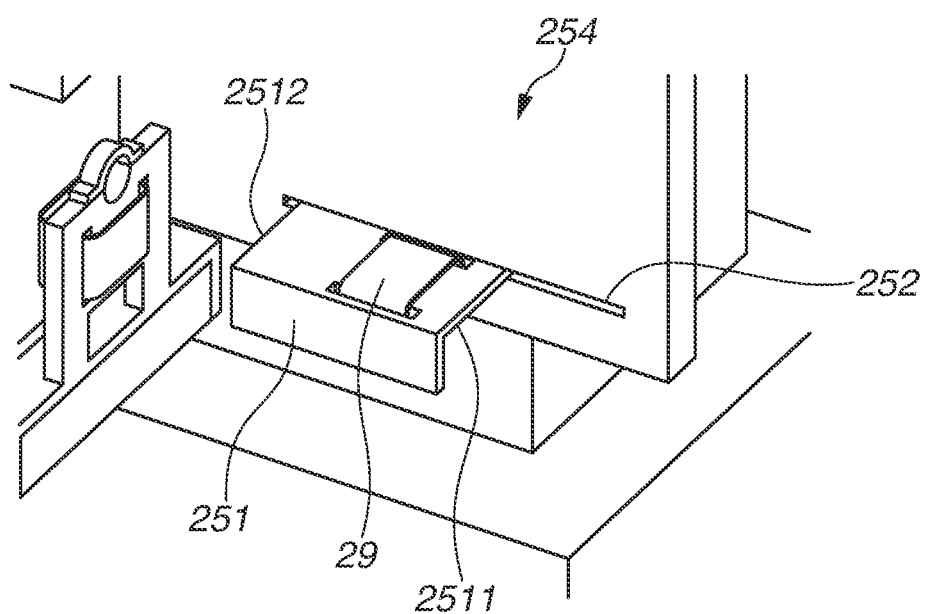
FIG. 7 is a perspective view illustrating a cable guide according to the first example embodiment.

Next, the cable guide unit 251 and a tilt clamp unit 253 are described with reference to FIG. 7 and FIG. 1. As illustrated in FIG. 7, the cable guide unit 251 according to the example embodiment is partially fitted into a long groove 252 provided on a side wall 254 of the rotator 25. The cable guide unit 251 is fixed to the side wall 254 so as to be slidable in the Z direction by sliding on the long groove 252. Further, the cable guide unit 251 includes the cable band 29 that can bundle the cables to the cable guide unit 251. The cable guide unit 251 can be fixed at a desired position in the Z direction by a not-illustrated fixing member. Further, an inlet 2511 of the cable guide unit 251 is disposed outside the above-described rotation locus. As described above, since the outer shape of each of the main camera 22 and the finder imaging camera 24 attached to the main camera 22 is unknown, it is regarded that the main camera 22 and the finder imaging camera 24 are not included in the rotation region. However, actually, the members appropriately exchangeable by the user may cause restriction. Therefore, the inlet 2511 is preferably disposed at a position with a margin. Further, the inlet 2511 of the cable guide unit 251 is disposed on rear side of an outlet 2512 of the cable guide unit 251 in the optical axis direction. As described above, since the position of the cable clamp unit 28 is changeable in the Z direction, the position of the cable guide unit 251 is also changeable based on the position of the cable clamp unit 28. In the example embodiment, while the cable guide unit 251 defines a path of the cables by forming a passage of the cables, a member that defines the path of the cables by fixing the cables is also called a cable guide in the disclosure and the specification.

Further, as illustrated in FIG. 1, the tilt clamp unit 253 that can clamp the cables is provided near a tilt rotation axis of the camera platform 21, through the side wall 254 of the rotator 25. The tilt clamp unit 253 has a hollow structure that enables insertion of the cables into the camera platform 21. When the cables are inserted into the hollow structure, the structure functions as a tilt clamp portion 2531. The tilt clamp portion 2531 is disposed inside the rotation locus drawn by the rotation region in the rotating operation in the tilt direction (hereinafter, tilt rotating operation). In the tilt rotating operation, the rotation locus is a locus drawn by the region farthest from a tilt rotation axis (x axis) of the rotation region, in the rotation in the tilt direction, on a plane (zy plane) perpendicular to the tilt rotation axis. The effects derived from the state where the tilt clamp unit 253 is disposed inside the rotation locus are described below.

The above is the description of the cable guide unit 251 and the tilt clamp portion 2531 disposed through the side wall 254 of the rotator 25.

Figure 8:
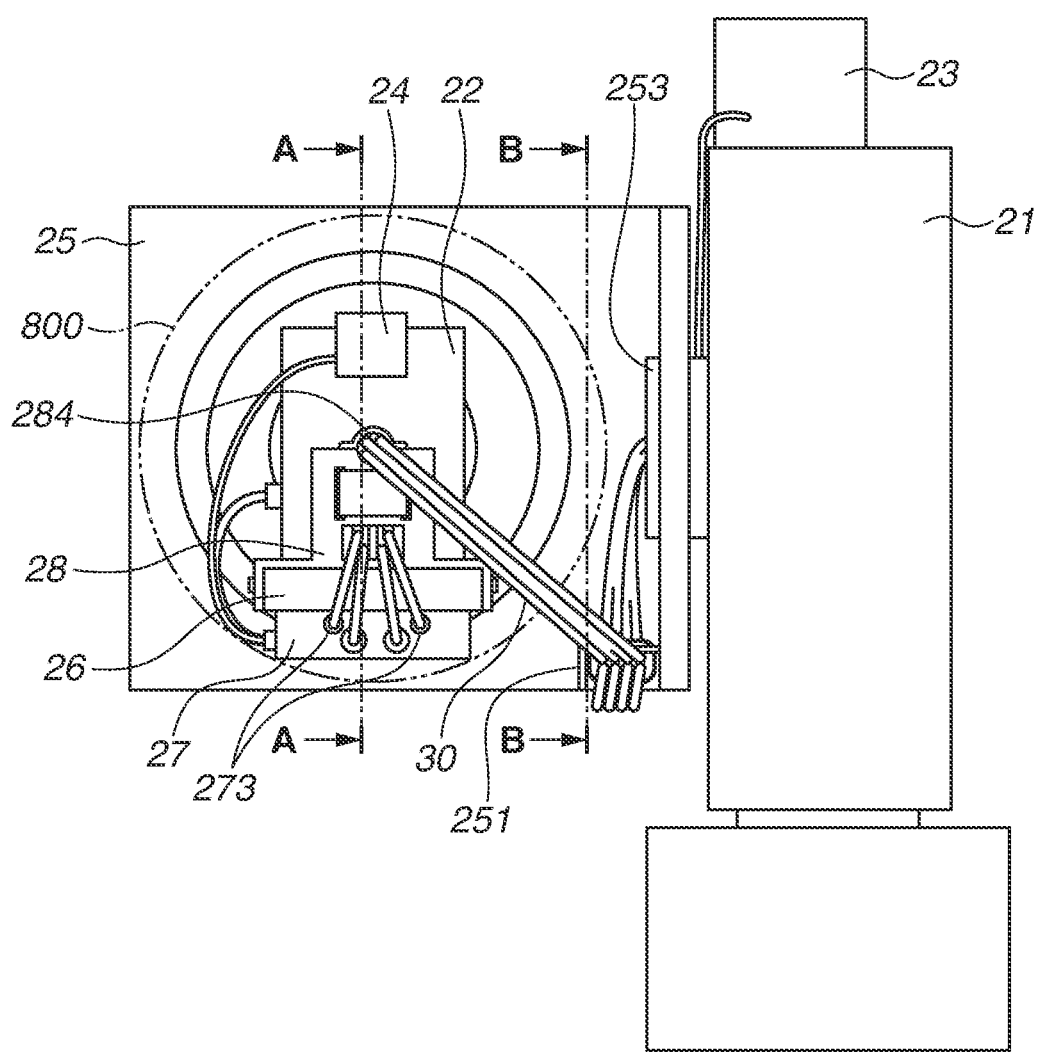
FIG. 8 is a back view of a camera platform system according to the first example embodiment.
Figure 9:
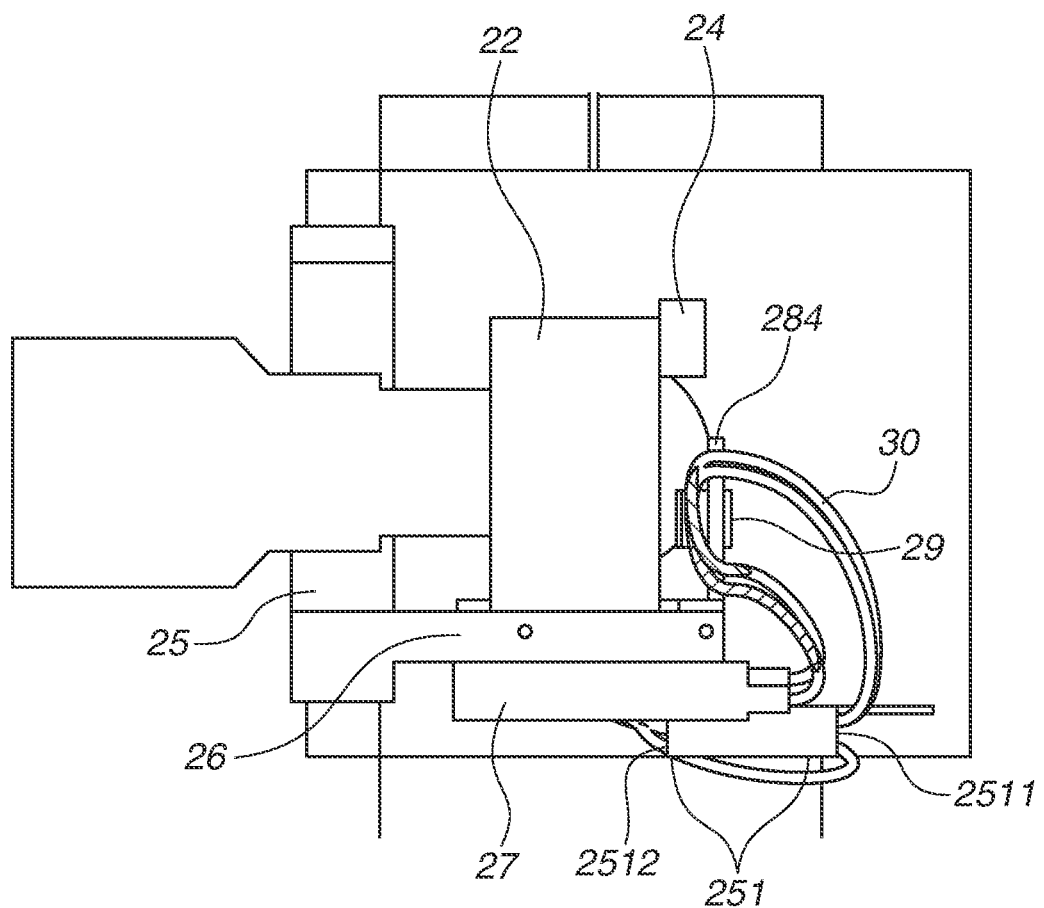
FIG. 9 is a cross-sectional view of the camera platform system according to the first example embodiment.
Figure 10:
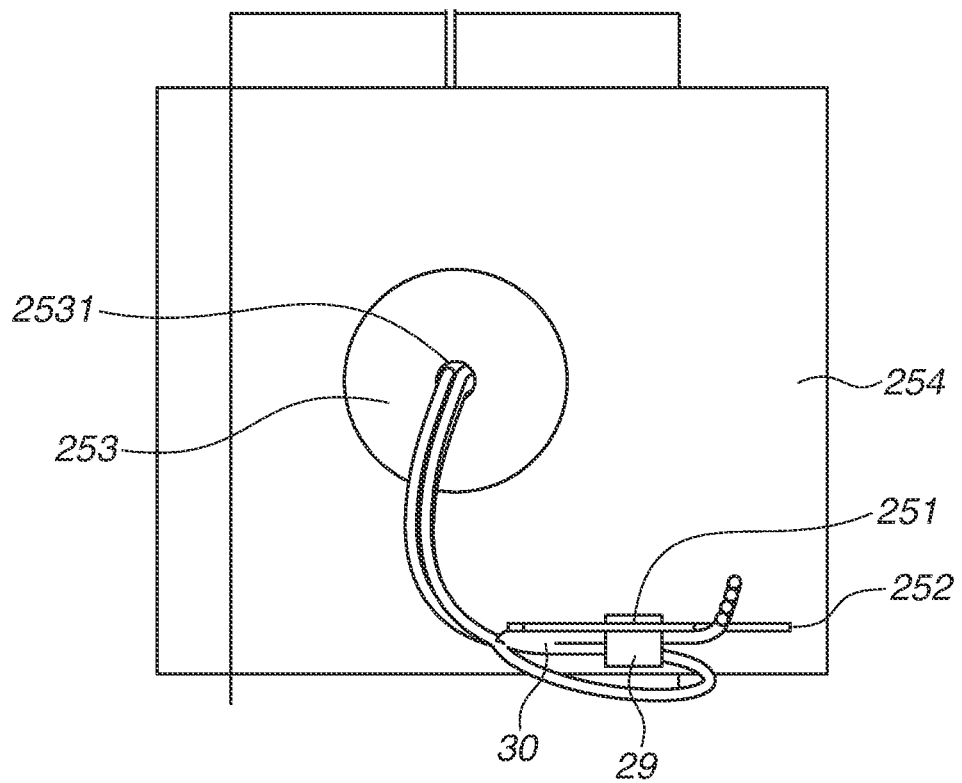
FIG. 10 is a cross-sectional view of the camera platform system according to the first example embodiment.

Next, a cable clamping method according to the example embodiment is described in detail with reference to FIG. 8 to FIG. 10. FIG. 8 is a back view of the camera platform system according to the example embodiment, FIG. 9 is a cross-sectional view taken along line A-A in FIG. 8, and FIG. 10 is a cross-sectional view taken along line B-B in FIG. 8. As illustrated in FIG. 8, the plurality of cables 30 extended from the electric connector 273 of the control box unit 27 is connected to the camera platform 21 via the cable clamp unit 28, the cable guide unit 251, and the tilt clamp unit 253 in order. The plurality of cables 30 is drawn into the camera platform 21 after passing through the tilt clamp unit 253.

As illustrated in FIG. 9, in the cable clamp unit 28, the plurality of cables 30 extended from the control box unit 27 passes through the second clamp portion 283 as a hollow hole, and then passes through the first clamp portion 284 in a state where the plurality of cables 30 is bundled by the cable band 29. When the plurality of cables 30 takes such a path, the plurality of cables 30 is changed in direction at substantially right angle when passing through the second clamp portion 283 and the first clamp portion 284. When the plurality of cables 30 takes such a path, external force, etc. is applied to the cables 30 between the cable clamp unit 28 and the cable guide unit 251. Even if the cables 30 are pulled, the load can be received by a corner of each of the second clamp portion 283 and the first clamp portion 284. This makes it possible to suppress force transmitted to the electric connectors of the control box unit 27, and to accordingly reduce possibility of breakage of the electric connector 273.

Next, as illustrated in FIG. 9, the plurality of cables 30 is inserted into the cable guide unit 251 from the inlet 2511 of the cable guide unit 251. Further, as illustrated in FIG. 10, the plurality of cables 30 is processed such that extra lengths of the cables 30 are bundled by the cable band 29. Thereafter, the plurality of cables 30 extended from the outlet 2512 of the cable guide unit 251 is clamped by the hollow structure of the tilt clamp unit 253 near the tilt axis, and is then connected to a not-illustrated connection portion inside the camera platform 21. The hollow structure functions as the tilt clamp portion 2531.

The above is the detailed description of the cable clamping method according to the example embodiment.

Figure 11:
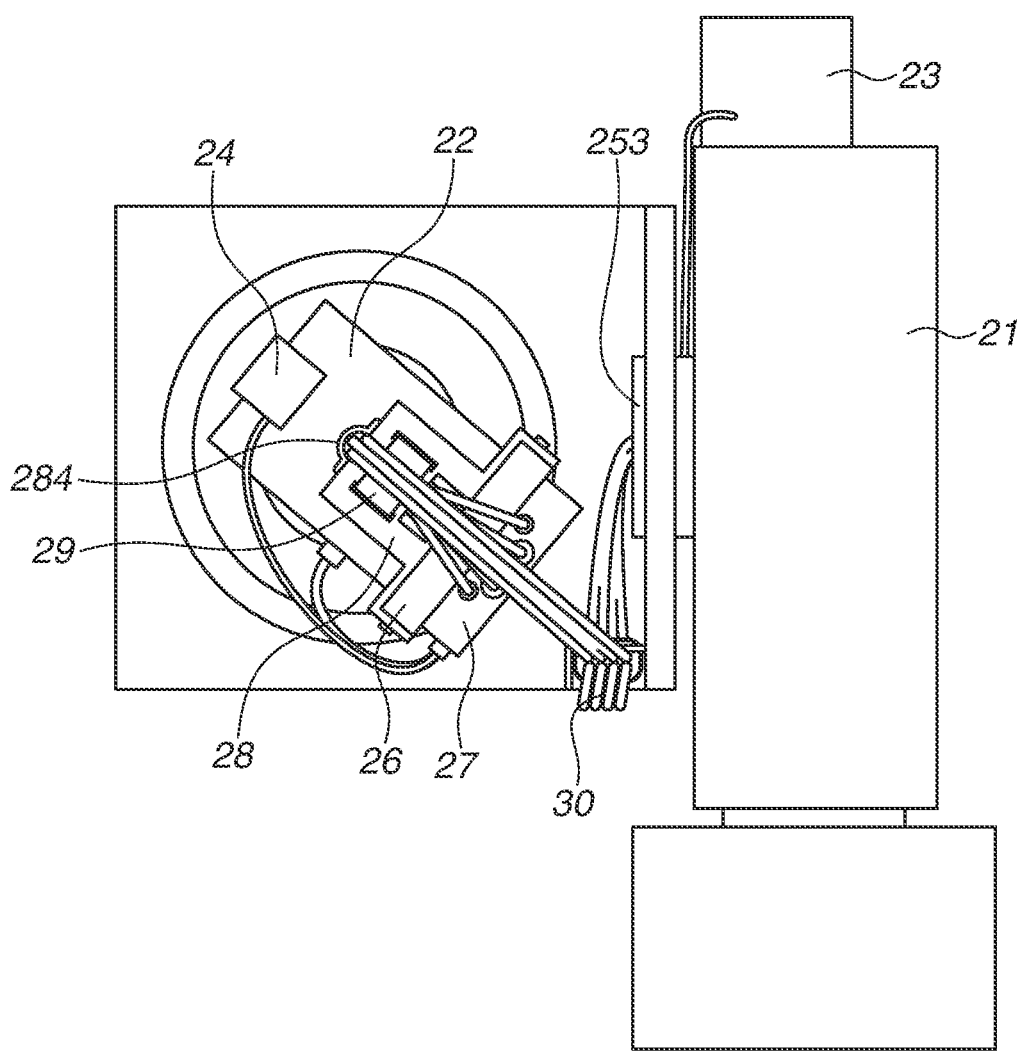
FIG. 11 is a back view of the camera platform system during roll operation according to the first example embodiment.

Next, motion of the plurality of cables 30 during the roll operation of the camera platform is described. When the camera platform apparatus performs the roll operation in the state illustrated in FIG. 8, the main camera 22, the camera stand 26, the control box unit 27, and the cable clamp unit 28 are integrally rotated around the Z axis as illustrated in FIG. 11. Then, the first clamp portion 284 and the second clamp portion 283 of the cable clamp unit 28 for the plurality of cables 30 both similarly perform roll rotating operation while one or more of the plurality of clamp portions is disposed inside the rotation locus 800. Accordingly, as compared with a case where one or more of the plurality of clamp portions is disposed outside the rotation locus 800, it is possible to suppress variation of the distance to the cable guide unit 251 along with the roll rotating operation. As a result, it is possible to reduce the extra lengths of the plurality of cables 30 with respect to the roll operation. Further, all of the plurality of clamp portions is preferably disposed inside the rotation locus 800 because the clamp portions can be provided without increasing the rotation region.

It is preferable that the distance from each of the clamp portions to the roll rotation axis be smaller than the maximum value of the distance between the camera stand 26 and the roll rotation axis in a plane perpendicular to the roll rotation axis, and be smaller than a half of a radius of the rotation locus. Further, it is more preferable that the distance from each of the clamp portions to the roll rotation axis be smaller than 10% of the radius of the rotation locus. In the case where the plurality of clamp portions is provided as with the example embodiment, it is more preferable that the distance from the clamp portion small in distance to the roll rotation axis (first clamp portion 284 in example embodiment) to the roll rotation axis satisfies this condition. This is because the small distance from the clamp portion to the roll rotation axis can reduce variation of the distance from the clamp portion to the guide unit 251 along with the roll rotation.

Figure 12:
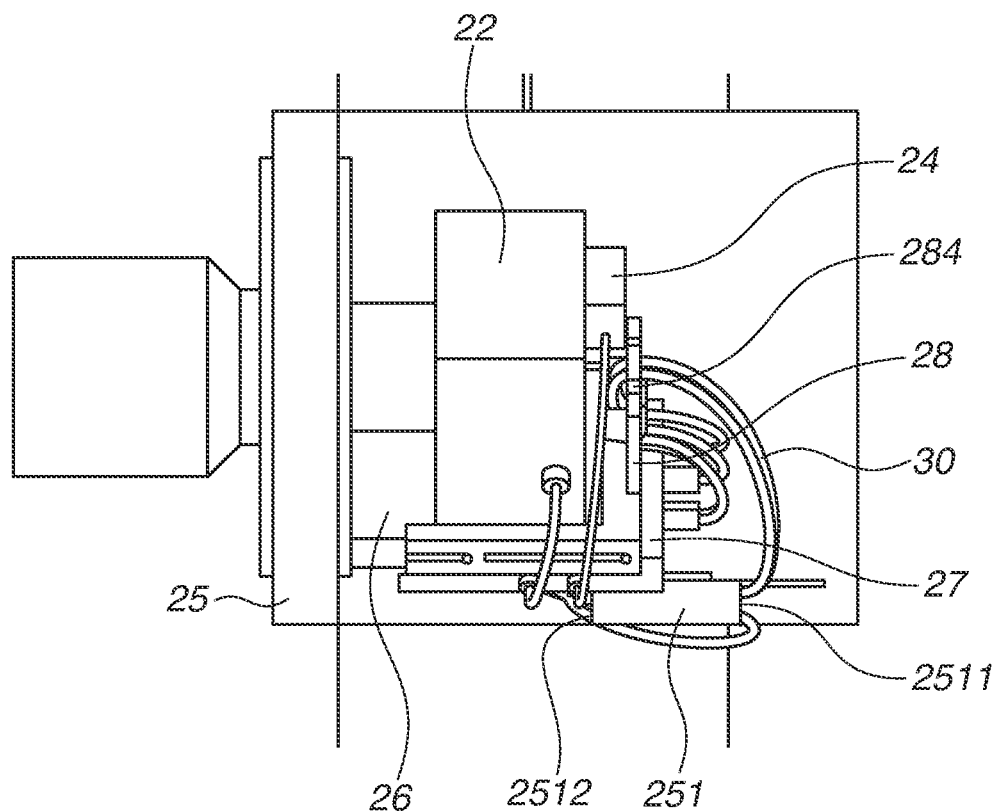
FIG. 12 is a side view of the camera platform system during the roll operation according to the first example embodiment.

Further, as illustrated in FIG. 9, the inlet 2511 of the cable guide unit 251 is disposed on rear side of the clamp position of the first clamp portion 284 in the roll rotation axis direction. The rear side in the roll rotation axis direction indicates side opposite to upstream side (lens side) of light entering the main camera 22 in a plane (xy plane; however, similar in xz plane) parallel to the roll rotation axis as illustrated in FIG. 9. As a result, as illustrated in FIG. 12, it is possible to reduce possibility of contact of the region from the cable clamp unit 28 for the plurality of cables 30 to the cable guide unit 251 and the region from the control box unit 27 to the cable clamp unit 28, during the roll rotating operation.

Next, motion of the plurality of cables 30 during the tilt operation is described. In the case of the tilt operation, the main camera 22, the rotator 25, the cable guide unit 251 the camera stand 26, the control box unit 27, the cable clamp unit 28, and the tilt clamp unit 253 are rotated around the X axis illustrated in FIG. 1. Further, the tilt clamp portion 2531 and the outlet 2512 of the cable guide unit 251 are disposed inside the rotation locus around the tilt rotation axis. Accordingly, as compared with a case where the tilt clamp portion 2531 is disposed outside the rotation locus, it is possible to reduce variation of the distance from the cable guide unit 251 along with the tilt rotating operation. The distance from the tilt clamp portion 2531 of the tilt clamp unit 253 to the tilt rotation axis is also preferably smaller than the maximum value of the distance between the camera stand 26 and the tilt rotation axis in the plane perpendicular to the tilt rotation axis, as with the distance between the first clamp portion 284 and the roll rotation axis. Further, the distance from the tilt clamp portion 2531 of the tilt clamp unit 253 to the tilt rotation axis is preferably smaller than the half of the radius of the rotation locus, and is more preferably smaller than 10% of the radius of the rotation locus.

This is because the small distance from the tilt clamp portion 2531 of the tilt clamp unit 253 to the tilt rotation axis can reduce variation of the distance from the tilt clamp portion 2531 of the tilt clamp unit 253 to the cable guide unit 251 along with the roll rotation.

As described above, in the camera platform system according to the example embodiment, the distance between the first clamp portion 284 and the roll rotation axis is set smaller than the radius of the rotation locus, and the distance from the tilt clamp portion 2531 of the tilt clamp unit 253 to the tilt rotation axis is set smaller than the radius of the rotation locus as well. This makes it possible to reduce the extra lengths of the cables as compared with the case where the distance from each of the clamp portions to the rotation axis is set equal to or larger than the radius of the rotation locus. As a result, the roll/tilt operation of the camera platform can be performed in a state where possibility of entanglement of the cables and contact between the cables and the camera platform 21 is reduced.

Further, since the first and second clamp portions of the cable clamp unit are retreated from the rear surface of the main camera 22, it is possible to secure workability in installation.

In the first example embodiment, the configuration in which the cable clamp unit 28 is attached to the camera stand 26 has been described. The attachment of the cable clamp unit, however, is not limited to the camera stand. In a second example embodiment, a configuration in which the cable clamp unit is integrated with the cable guide unit and is attached to the side wall of the rotor is described as an example. In the example embodiment, the configuration other than the configuration of the cable clamp unit and the cable guide unit is similar to the configuration in the first example embodiment. Therefore, description thereof is omitted.

Figure 13A:
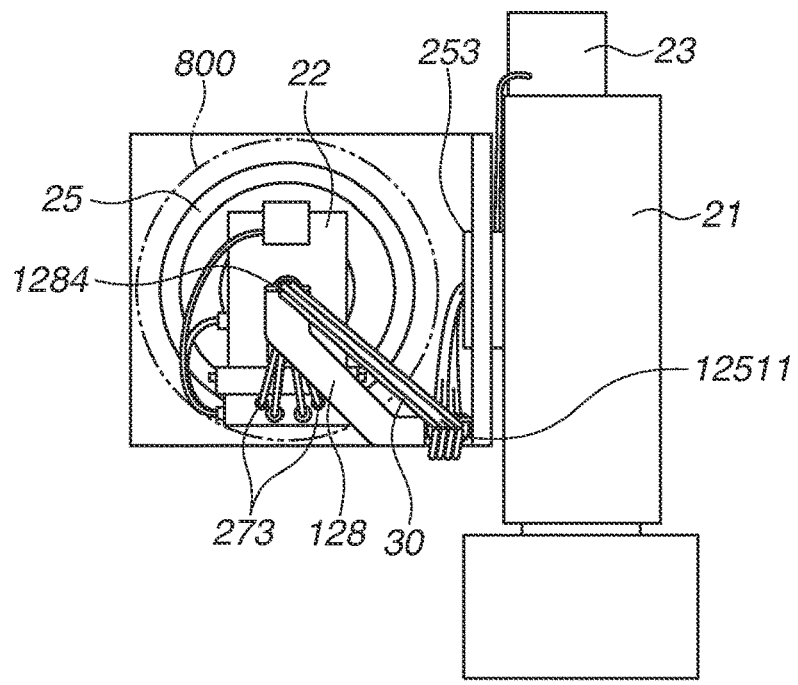
FIGS. 13A and 13B are a back view and a side view of a camera platform system according to a second example embodiment, respectively.
Figure 13B:
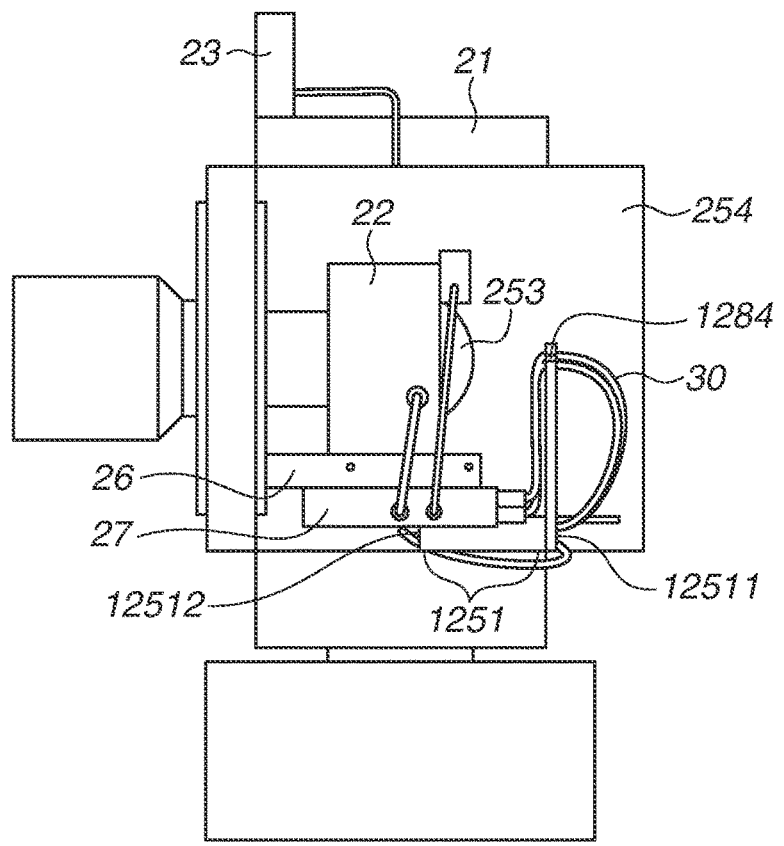

FIGS. 13A and 13B are a back view and a side view, respectively, according to the example embodiment. In the example embodiment, a cable clamp unit 128 is integrated with a cable guide unit 1251, and is attached through fitting of the cable guide unit 1251 into the long groove 252 on the side wall 254 of the rotator 25. The cable clamp unit 128 includes a clamp portion 1284 that has the configuration same as the first clamp portion in the first example embodiment, but does not include a clamp portion corresponding to the second clamp portion in the first example embodiment. Further, as illustrated in FIG. 13B, the clamp portion 1284 and an inlet 12511 of the cable guide unit 1251 are located at the same position in the optical axis direction (i.e., when the clamp portion 1284 and the inlet 12511 of the cable guide unit 1251 are projected on the zy plane, z coordinates thereof are coincident). The clamp portion is disposed inside the rotation locus 800, and the inlet 12511 of the cable guide unit 1251 is disposed outside the rotation locus 800 as with the first example embodiment. The other configuration is similar to the configuration in the first example embodiment. Therefore, description thereof is omitted.

In the example embodiment, the cables 30 extended from the electric connector of the control box unit 27 are clamped by the hollow structure of the clamp portion 1284. The clamped cables 30 are guided from the inlet 12511 to an outlet 12512 of the cable guide unit 1251, by the cable guide unit 1251 as with the first example embodiment. Further, the cables 30 are clamped by the tilt clamp portion 2531 of the tilt clamp unit 253 and are inserted into the camera platform 21.

As with the first example embodiment, the plurality of cables is clamped by the clamp portion inside the rotation locus 800 also in the example embodiment. Accordingly, it is possible to reduce variation of the distance between the clamp portion 1284 and the inlet 12511 of the cable guide unit 1251 along with the roll rotation. As with the first example embodiment, the distance between the clamp portion and the roll rotation axis is preferably small.

The cable clamp unit 128 according to the example embodiment also may include a plurality of clamp portions, as with the cable clamp unit 28 according to the first example embodiment. The configuration in which the clamp portion (one of plurality of clamp portions if provided) for the plurality of cables 30 is disposed at a position substantially coincident with the rotation axis of the roll operation and the cables are clamped at the center of the rotation axis of the roll operation has been described. As described above, it is sufficient to provide the clamp portion inside the rotation locus 800. The cable clamp unit 128 may clamp the cables at a position separated from the rotation axis based on a range of the rotating operation of the camera platform system, etc.

Further, in the first and second example embodiments, the example in which the main camera 22 and the camera platform 21 are electrically connected to each other through the control box unit 27 has been illustrated. Therefore, clamping of the cables connecting the control box unit 27 and the camera platform 21 has been described; however, the main camera 22, the wide-angle imaging camera 23, etc. may be directly connected to the camera platform 21, and the clamping may be applied to the cables that directly connect the main camera 22 and the camera platform 21. In the disclosure and the specification, the main camera 22 and the camera platform 21 are regarded to be connected to each other as long as the main camera 22 and the camera platform 21 are electrically connected with each other even when the main camera 22 and the camera platform 21 are connected to each other directly or through one or more devices such as the control box unit 27.

Further, in the example embodiment, the first clamp portion 284 configures the hollow structure by the first member 2841 and the second member 2842, and the second clamp portion 283 has the hollow structure provided in the plate; however, the configurations of the first and second clamp portions are not limited to this configurations. The configurations of the first and second clamp portions may be reversed from each other, each of the clamp portions may have an openable hollow structure, or each of the clamp portions may have the hollow structure provided in the plate. Further, the structure is not limited to the hollow structure as long as the structure can fix the cables by changing the extending direction of the cables. For example, a structure in which a plurality of columns each extending in the x-axis direction is arranged in the y-axis direction may be used.

In a third example embodiment, a configuration example of a cable clamp unit different from the cable clamp unit according to the first example embodiment is described. The cable clamp unit according to the example embodiment can be divided into a portion (first clamp member 321) fixed to the camera stand and a portion (second clamp member 322) fixed to the cables. When the portion fixed to the camera stand and the portion fixed to the cables are connected to each other, the cables that are extended from the main camera 22 fixed to the camera stand can be clamped. In the example embodiment, the camera platform performs pan driving around the camera fixed to the camera stand. The configuration other than the cable clamp unit and the camera platform body is similar to the configuration according to the first example embodiment. Therefor, description of the configuration is omitted.

In the camera platform apparatus according to the example embodiment, the center of the main camera 22 is disposed on an extension of the pan axis, and the pan rotation axis and a sensor position of the main camera 22 are substantially coincident with each other during pan operation. This enables a user inexperienced in handling the camera platform apparatus in which the pan rotation axis and the center of the main camera 22 are largely shifted from each other as with the first example embodiment, to perform operation with less strangeness.

The configuration according to the example embodiment is described with reference to FIG. 14, FIG. 15, and FIG. 16.

Figure 14:
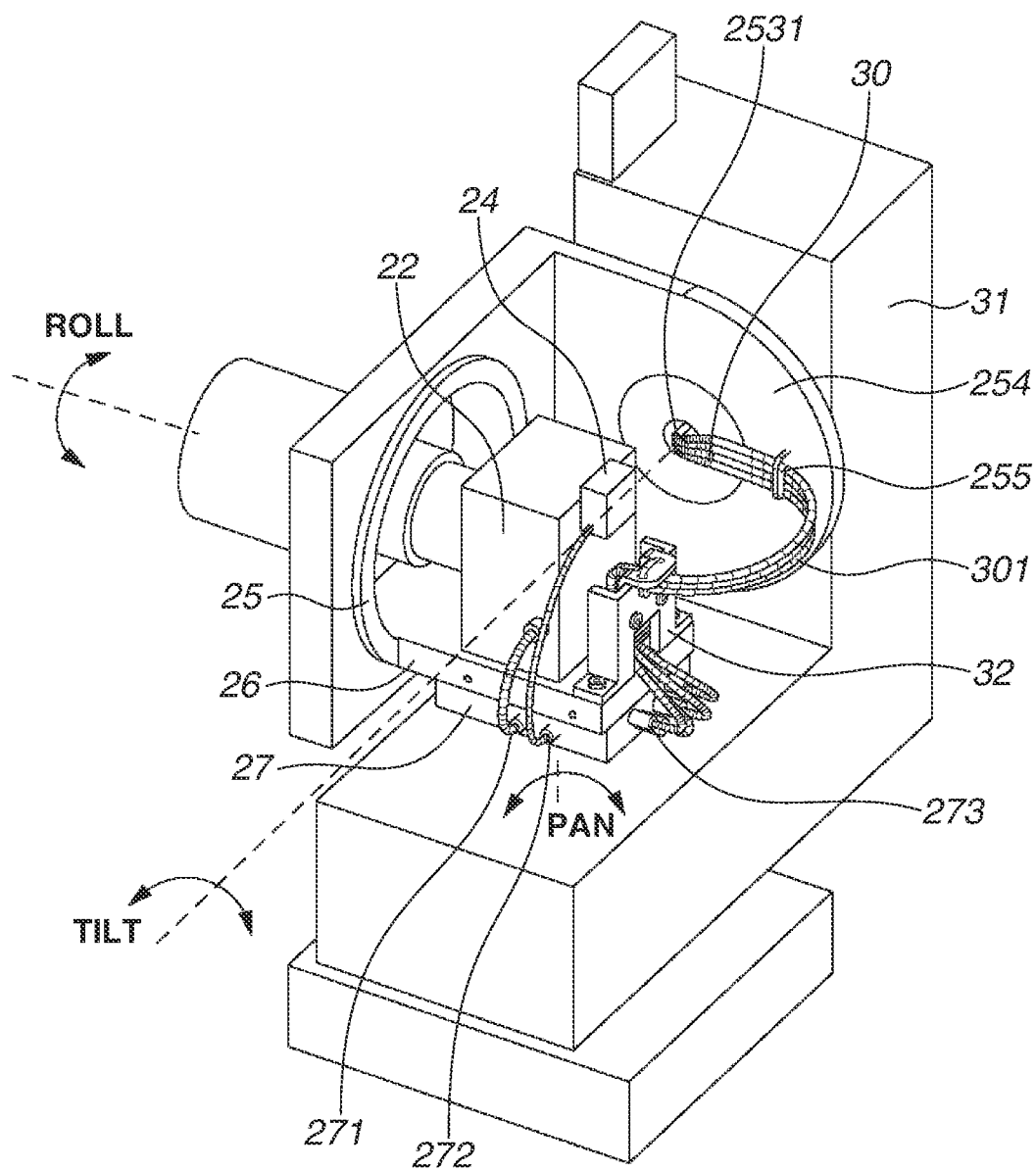
FIG. 14 is a perspective view according to a third example embodiment.

FIG. 14 is a perspective view according to the example embodiment. A camera platform 31 has a substantially L-shape, and the pan axis is disposed on an extension of a substantially center of the main camera 22. The cables 30 passes through an inside of the camera platform 31 and are drawn out from the tilt clamp portion 2531, are then drawn out in the Z-axis rear direction along the side wall 254 of the rotator 25, and are fixed to the side wall 254 of the rotator 25 by a cable fixing member 255. The cable fixing member 255 functions as a guide unit that guides the cables 30 drawn out from the tilt clamp portion 2531. As the cable fixing member 255, a member that can fix the cables 30 to the side wall 254 of the rotator 25, for example, a binding band can be used. The cables 30 fixed to the side wall 254 of the rotator 25 are connected to the clamp unit 32 so as to roughly draw a semicircle. A portion of the cables 30 roughly drawing the semicircle from the cable fixing member 255 to the clamp unit 32 is referred to as an arch portion 301.

Figure 15:
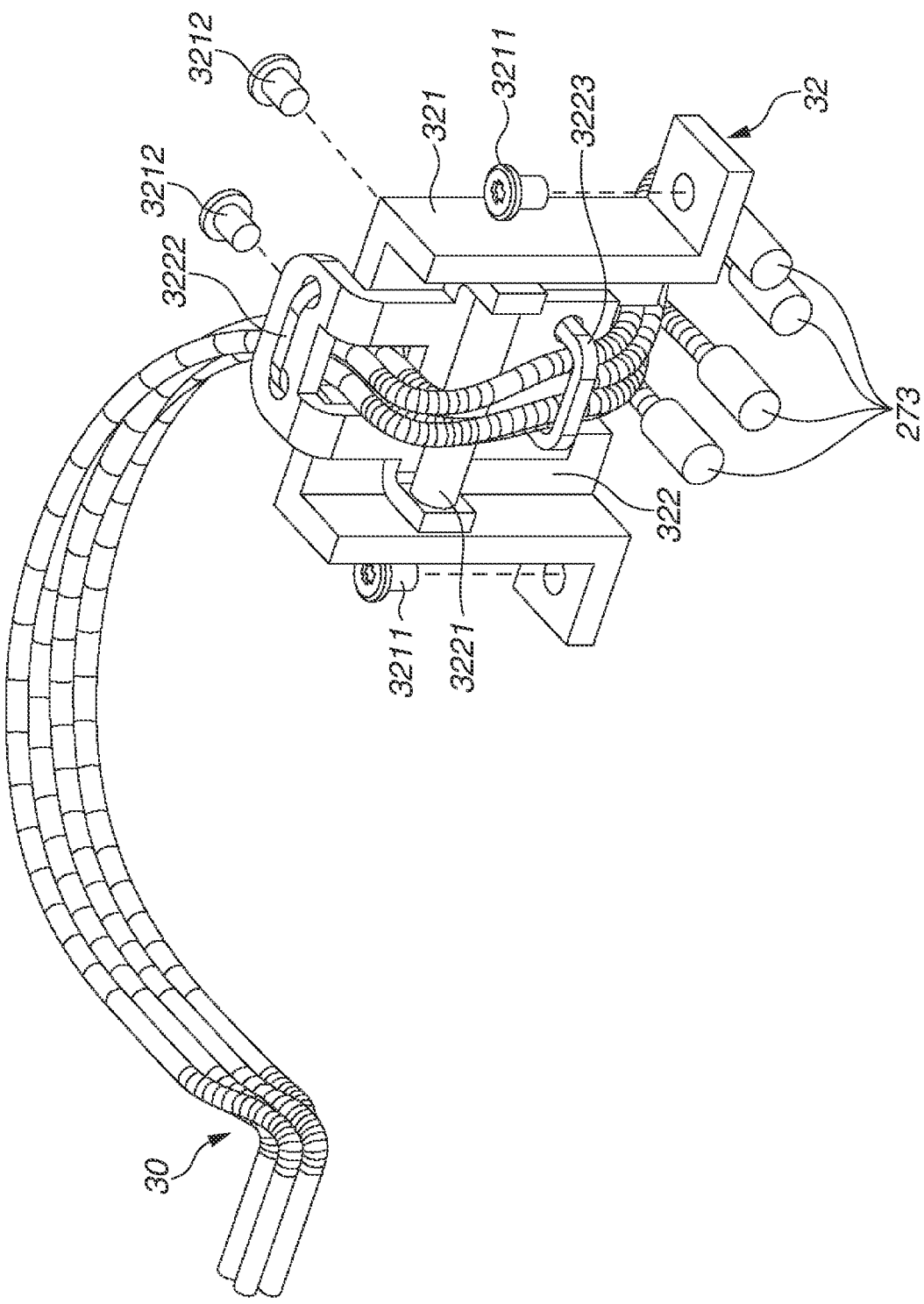
FIG. 15 is a perspective view of a cable clamp unit according to the third example embodiment.

FIG. 15 is a perspective view of the clamp unit 32 to which the cables 30 have been assembled. The clamp unit 32 includes the first clamp member 321 and the second clamp member 322.

The first clamp member 321 includes screw holes for respective screws 3212 that fix the second clamp member 322, and screw holes for respective screws 3211 that fix the first clamp member 321 to the camera stand 26.

The second clamp member 322 includes a first clamp portion 3222, a shaft portion 3221, and a second clamp portion 3223, and is fixed to the first clamp member 321 by the screws 3212. The first and second clamp portions 3222 and 3223 are holes, whereas the shaft portion 3221 is a protrusion to which the cables 30 are hooked. The extending direction of the cables 30 clamped by the first clamp portion 3222 is changed to the opposite direction by clamping the cables 30 by the protrusion, the extending direction of the cables 30 is further changed to the opposite direction again by the second clamp portion 3223, and the cables 30 are fixed. As a result, the cables 30 can be clamped in a z-shape. With such a configuration, when the arch portion 301 of the cables 30 is unexpectedly pulled by the user in the Z-axis rear direction or is caught during the tilt operation, the shaft portion 3221 as the protrusion receives the pulling force. As a result, force is not directly applied to the electric connector 273 at a front end of the shaft portion 3221, which makes it possible to prevent breakage of the electric connector 273.

The configuration of the second clamp member 322 is not limited to the configuration as long as the second clamp member 322 can clamp and fix the cables 30 to the first clamp member 321. For example, the first clamp portion 3222 may function as the clamp portion when the second clamp member 322 is fixed to the first clamp member 321 in a manner similar to the groove 2841 and the lid 2842 described in the first example embodiment. Further, the first clamp portion 3222 may function when the second clamp member 322 has a hole larger than a diameter of the cables 30 and the first clamp member 321 closes a part of the hole.

The second clamp member 322 that includes the first and second clamp portions 3222 and 3223 clamping the cables 30 is fixed to the camera stand 26 through the first clamp member 321, which makes it possible to clamp the cables 30 inside the rotation locus by the rotation region.

A cable clamping method using the clamp unit 32 is described.

After the cables 30 fixed by the cable fixing member 255 are clamped by the first clamp portion 3222, the cables 30 are wound around the shaft portion 3221, and the cables 30 are clamped by the second clamp portion 3223. After the second clamp member 322 is fixed to the first clamp member 321 by the screws 3212, the first clamp member 321 is fixed to the camera stand 26 by the screws 3211.

The clamp unit 32 is divided into two members of the first clamp member 321 and the second clamp member 322, and roles are assigned such that the first clamp member 321 is fixed to the camera stand 26 and the second clamp member 322 fixes the cables 30, which enables downsizing of the second clamp member 322.

Figure 16:
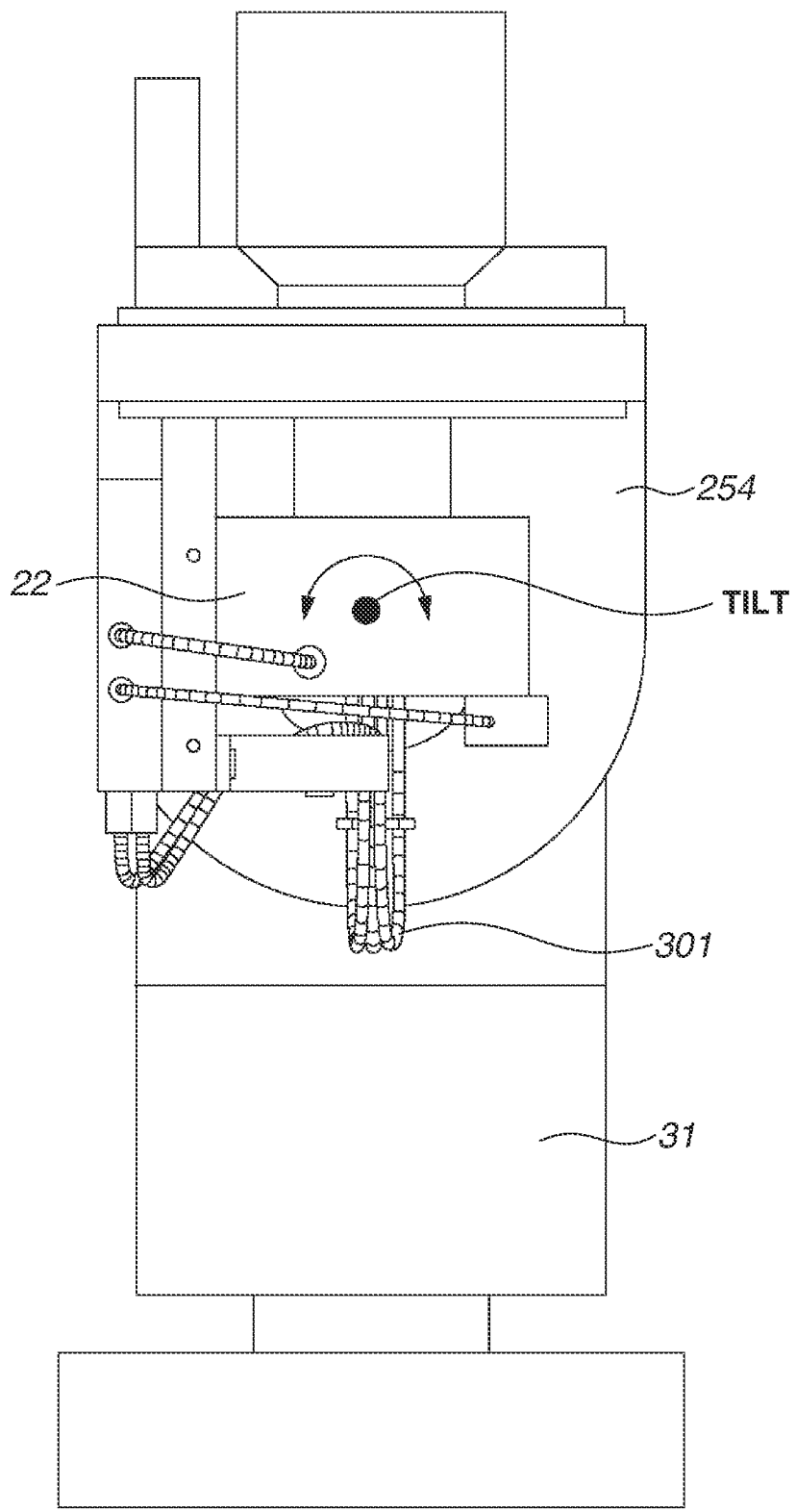
FIG. 16 is a side view illustrating a main camera directed upward according to the third example embodiment.

FIG. 16 is a side view when the main camera 22 is tilted and is directed upward. The attitude is also used in underslung imaging in which the camera platform 31 is suspended from a ceiling and the main camera is directed downward. In the state illustrated in FIG. 16, the arch portion 301 is closest to the camera platform 31. If the arch portion 301 is excessively long, the arch portion 301 and the camera platform 31 may interfere with each other to inhibit the tilt operation. Further, if the arch portion 301 is excessively short, the finder imaging camera 24 and the camera stand 26 may interfere with the arch portion 301 during the roll operation, which may inhibit operation. Accordingly, the arch portion 301 preferably has a constant length even when attachment and detachment of the electric connector 273 are repeated. When the second clamp member 322 is downsized, the electric connector 273 hardly becomes an obstacle even while the second clamp member 322 is fixed to the cables in a state where the electric connector 273 is not inserted into the control box unit 27 at a time other than imaging. Therefore, the second clamp member 322 is continuously fixed to the cables after the length of the arch portion 301 is adjusted once, which makes it possible to omit labor of adjusting the length of the arch portion 301 every time the electric connector 273 is attached/detached.

Although detail is not described, downsizing of the second clamp member 322 is preferable also when a rain cover member is provided for the main camera 22 and the control box unit 27, and the control box unit 27 and the camera platform 31 not covered with the rain cover member are connected by the cables 30. In this case, it is necessary to put the second clamp member 322 to which the cables 30 have been assembled, through a hole of the rain cover. When the second clamp member 322 is downsized, an opening of the hole can be reduced, which facilitates subsequent waterproofing of the hole.

A procedure to exchange the main camera 22 by the user is described with reference to FIG. 14 and FIG. 15. The user first detaches the electric connector 271, the electric connector 272, and the electric connector 273. Next, the user detaches the screws 3211 that fixed the clamp unit 32 and the camera stand 26. Thereafter, the user detaches the clamp unit 32 from the camera stand 26. Finally, the user detaches the main camera 22 from the camera stand 26. This enables exchange of the main camera 22. When the main camera 22 is exchanged, the cables 30 are fixed to the side wall 254 of the rotator 25 and the clamp portion 3222 of the clamp unit 32, and the constant length of the arch portion 301 can be maintained. Adopting the configuration makes it possible to solve the above-described issues.

While the disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Applications No. 2018-205866, filed Oct. 31, 2018, and No. 2019-143102, filed Aug. 2, 2019, which are hereby incorporated by reference herein in their entirety.

What is claimed is:

1. A camera platform system, comprising:
   a stand to which an imaging apparatus is able to be fixed;
   a camera platform apparatus configured to rotate the imaging apparatus fixed to the stand in a roll direction and a tilt direction by rotating the stand;
   a first clamp unit configured to clamp, on a rear surface side of the imaging apparatus, a cable that electrically connects the imaging apparatus and the camera platform apparatus;
   a guide unit configured to guide the cable clamped by the clamp unit, to the camera platform apparatus; and
   a second clamp unit configured to clamp the cable from the guide unit,
   wherein the first clamp unit is disposed inside a rotation locus by a rotation region that is rotated integrally with the stand when the imaging apparatus is rotated in the roll direction, and
   wherein the guide unit is disposed outside the rotation locus.

2. The camera platform system according to claim 1, wherein the guide unit is disposed on a rear side of the first clamp unit in an optical axis direction.

3. The camera platform system according to claim 1, wherein the first clamp unit includes a first clamp portion and a second clamp portion, and
   wherein the first clamp portion is disposed near a rotation axis of the rotation relative to the second clamp portion.

4. The camera platform system according to claim 3, wherein the imaging apparatus and the camera platform apparatus are electrically connected through a control apparatus of the imaging apparatus,
   wherein the control apparatus includes an electric connector portion into which the cable is inserted, and
   wherein the first clamp unit clamps the cable extended from the electric connector portion of the control apparatus.

5. The camera platform system according to claim 4, wherein the second clamp portion is disposed near the electric connector portion relative to the first clamp portion.

6. The camera platform system according to claim 5, wherein the first clamp portion and the second clamp portion guide the cable extended from the electric connector portion in a direction of the rotation axis of the roll direction and clamp the cable.

7. The camera platform system according to claim 3, wherein the imaging apparatus and the camera platform apparatus are electrically directly connected,
   wherein the imaging apparatus includes an electric connector portion into which the cable is inserted, and
   wherein the first clamp unit clamps the cable extended from the electric connector portion of the imaging apparatus.

8. The camera platform system according to claim 3, wherein each of the first clamp portion and the second clamp portion has a hollow structure.

9. The camera platform system according to claim 8, wherein the hollow structure of the first clamp portion is configured by a first member and a second member, and
   wherein the second member is movable with respect to the first member.

10. The camera platform system according to claim 1, wherein at least one of the first clamp unit and the guide unit includes an adjustment portion configured to adjust an extra length of the cable.

11. The camera platform system according to claim 1, wherein at least one of the first clamp unit and the guide unit is changeable in position in an optical axis direction.

12. The camera platform system according to claim 1, wherein the first clamp unit is fixed to be rotatable to the stand, and takes a first position at which a distance from a roll rotation axis is short relative to the stand, and a second position at which the distance from the roll rotation axis is long relative to the stand.

13. The camera platform system according to claim 1, wherein the first clamp unit includes a first clamp member that is fixed to the stand, and a second clamp member that includes a clamp portion fixing the cable and is fixed to the first clamp member.

14. The camera platform system according to claim 1,
wherein the camera platform apparatus rotates the imaging apparatus in the roll direction by rotating the stand around a first rotation axis, and
wherein the camera platform apparatus rotates the imaging apparatus in the tilt direction by rotating the stand around a second rotation axis different from the first rotation axis.

15. A camera platform system, comprising:
a stand to which an imaging apparatus is able to be fixed;
a camera platform apparatus configured to rotate the imaging apparatus fixed to the stand in a roll direction by rotating the stand;
a clamp unit configured to clamp, on a rear surface side of the imaging apparatus, a cable that electrically connects the imaging apparatus and the camera platform apparatus; and
a guide unit configured to guide the cable clamped by the clamp unit, to the camera platform apparatus,
wherein the imaging apparatus and the camera platform apparatus are electrically connected through a control apparatus of the imaging apparatus,
wherein the control apparatus includes an electric connector portion into which the cable is inserted,
wherein the clamp unit clamps the cable extended from the electric connector portion of the control apparatus,
wherein the clamp unit is disposed inside a rotation locus by a rotation region that is rotated integrally with the stand when the imaging apparatus is rotated in the roll direction,
wherein the clamp unit includes a first clamp portion and a second clamp portion,
wherein the first clamp portion is disposed near a rotation axis of the rotation relative to the second clamp portion,
wherein the second clamp portion is disposed near the electric connector portion relative to the first clamp portion, and
wherein the guide unit is disposed outside the rotation locus.

16. A camera platform system, comprising:
a stand to which an imaging apparatus is able to be fixed;
a camera platform apparatus configured to rotate the imaging apparatus fixed to the stand in a roll direction by rotating the stand;
a clamp unit configured to clamp, on a rear surface side of the imaging apparatus, a cable that electrically connects the imaging apparatus and the camera platform apparatus; and
a guide unit configured to guide the cable clamped by the clamp unit, to the camera platform apparatus,
wherein the clamp unit is disposed inside a rotation locus by a rotation region that is rotated integrally with the stand when the imaging apparatus is rotated in the roll direction,
wherein the clamp unit includes a first clamp portion and a second clamp portion,
wherein the first clamp portion is disposed near a rotation axis of the rotation relative to the second clamp portion,
wherein each of the first clamp portion and the second clamp portion has a hollow structure,
wherein the hollow structure of the first clamp portion is configured by a first member and a second member,
wherein the second member is movable with respect to the first member and
wherein the guide unit is disposed outside the rotation locus.

* * * * *